US012457308B2

(12) United States Patent
Morikuni

(10) Patent No.: US 12,457,308 B2
(45) Date of Patent: Oct. 28, 2025

(54) PROJECTION DEVICE AND METHOD FOR CONTROLLING PROJECTION DEVICE

(71) Applicant: SEIKO EPSON CORPORATION, Tokyo (JP)

(72) Inventor: Eiji Morikuni, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 303 days.

(21) Appl. No.: 18/084,557

(22) Filed: Dec. 20, 2022

(65) Prior Publication Data

US 2023/0199155 A1 Jun. 22, 2023

(30) Foreign Application Priority Data

Dec. 21, 2021 (JP) ................. 2021-206795

(51) Int. Cl.
*H04N 9/31* (2006.01)
*G03B 21/14* (2006.01)

(52) U.S. Cl.
CPC ......... *H04N 9/3117* (2013.01); *G03B 21/145* (2013.01); *H04N 9/3167* (2013.01)

(58) Field of Classification Search
CPC .. G03B 21/005; G03B 21/006; G03B 21/008; G03B 21/14; G03B 21/28; G03B 21/142; G03B 21/54; G03B 21/145; G03B 21/147; H04N 9/3117; H04N 9/3167; H04N 9/3185; H04N 9/3194

See application file for complete search history.

(56) References Cited

U.S. PATENT DOCUMENTS

| 11,099,469 | B1* | 8/2021 | Selfe ................. G03B 21/2066 |
| 2002/0176015 | A1 | 11/2002 | Lichtfuss |
| 2012/0176298 | A1 | 7/2012 | Suh et al. |
| 2016/0188122 | A1* | 6/2016 | Capps .................. H04N 23/21 345/175 |
| 2016/0365394 | A1 | 12/2016 | Suh et al. |
| 2017/0103687 | A1* | 4/2017 | Ano ..................... G09G 3/002 |
| 2017/0154570 | A1 | 6/2017 | Suh et al. |

(Continued)

FOREIGN PATENT DOCUMENTS

| JP | 2002369050 | 12/2002 |
| JP | 2004198868 | 7/2004 |

(Continued)

*Primary Examiner* — Sultan Chowdhury
(74) *Attorney, Agent, or Firm* — JCIPRNET

(57) ABSTRACT

A projection device includes: a projection unit configured to project image light to a projection target; an image-capturing unit configured to capture an image of a range including the projection target to generate a captured image; a communication unit; and a control unit configured to transmit the captured image to an information processing device by the communication unit and cause a reception image received by the communication unit from the information processing device to be projected by the projection unit. The projection unit includes an image light forming unit configured to form image light and a projection optical system configured to project the image light formed by the image light forming unit toward the projection target. The image-capturing unit includes an imaging element configured to receive light through the projection optical system.

15 Claims, 12 Drawing Sheets

(56) References Cited

U.S. PATENT DOCUMENTS

| | | | | |
|---|---|---|---|---|
| 2017/0302898 A1* | 10/2017 | Kasuga | ............... | G03B 21/147 |
| 2018/0352227 A1* | 12/2018 | Kobayashi | .............. | G06T 11/60 |
| 2019/0037186 A1* | 1/2019 | Yoshimura | ....... | H04N 21/42204 |
| 2021/0063861 A1* | 3/2021 | Okino | .................. | H04N 9/3147 |
| 2021/0264871 A1* | 8/2021 | Akatsuka | ........... | H04N 21/4122 |
| 2022/0384526 A1 | 12/2022 | Yamazaki et al. | | |

FOREIGN PATENT DOCUMENTS

| | | |
|---|---|---|
| JP | 2005121747 | 5/2005 |
| JP | 2015161748 | 9/2015 |
| JP | 2017037317 | 2/2017 |
| JP | 2018098598 | 6/2018 |
| JP | 2021076836 | 5/2021 |

\* cited by examiner

PROJECTION DEVICE AND METHOD FOR CONTROLLING PROJECTION DEVICE

The present application is based on, and claims priority from JP Application Serial Number 2021-206795, filed Dec. 21, 2021, the disclosure of which is hereby incorporated by reference herein in its entirety.

BACKGROUND

1. Technical Field

The present disclosure relates to a projection device and a method for controlling the projection device.

2. Related Art

Traditionally, there is known a technique for drawing characters or the like overlaid on an image projected by a projector. For example, the device disclosed in JP-A-2015-161748 allows characters to be written by hand and overlaid on an image projected to a screen. This device can record data of handwritten characters in association with projected video data in a recording medium, and play the video data and the handwritten characters in a superimposed manner.

Traditionally, it is difficult to share an image such as a projection image of a projector and handwritten characters or the like that are in a state of being overlaid on each other among a plurality of devices.

SUMMARY

An aspect of the present disclosure includes a projection unit configured to project image light to a projection target, an image-capturing unit configured to capture an image of a range including the projection target to generate a captured image, a communication unit, and a control unit configured to transmit the captured image to an information processing device by the communication unit and cause a reception image received by the communication unit from the information processing device to be projected by the projection unit, wherein the projection unit includes an image light forming unit configured to form image light and a projection optical system configured to project the image light formed by the image light forming unit toward the projection target, the image-capturing unit includes an imaging element configured to receive light through the projection optical system, and the control unit receives the reception image including an image drawn by the information processing device by the communication unit.

Another aspect of the present disclosure is a projection device including a projection unit configured to project image light to a projection target, an image-capturing unit configured to capture an image of a range including the projection target to generate a captured image, a communication unit configured to communicate with an information processing device, and a control unit, wherein the control unit performs control so that by the communication unit, the captured image is transmitted to the information processing device and a drawing image is received from the information processing device and by the projection unit, the drawing image is projected to the projection target and the captured image is not projected.

Another aspect of the present disclosure is a method for controlling a projection device including a projection unit configured to project image light to a projection target, an image-capturing unit configured to capture an image of a range including the projection target to generate a captured image, and a communication unit configured to communicate with an information processing device, the method including by a communication unit, transmitting a captured image generated by an image-capturing unit as a first image to an information processing device and receiving a second image including a first drawing image drawn relative to the first image in the information processing device, by a projection unit, projecting the first drawing image to a projection target, by the image-capturing unit, capturing an image of a range including the projection target to which the first drawing image is projected to generate a captured image, by the communication unit, transmitting the captured image as a third image to the information processing device and receiving a fourth image including a second drawing image drawn relative to the third image in the information processing device, and by the projection unit, projecting the first drawing image and the second drawing image to the projection target.

DESCRIPTION OF EXEMPLARY EMBODIMENTS

1. First Embodiment 1-1. Configuration of Projection System

Figure 1:
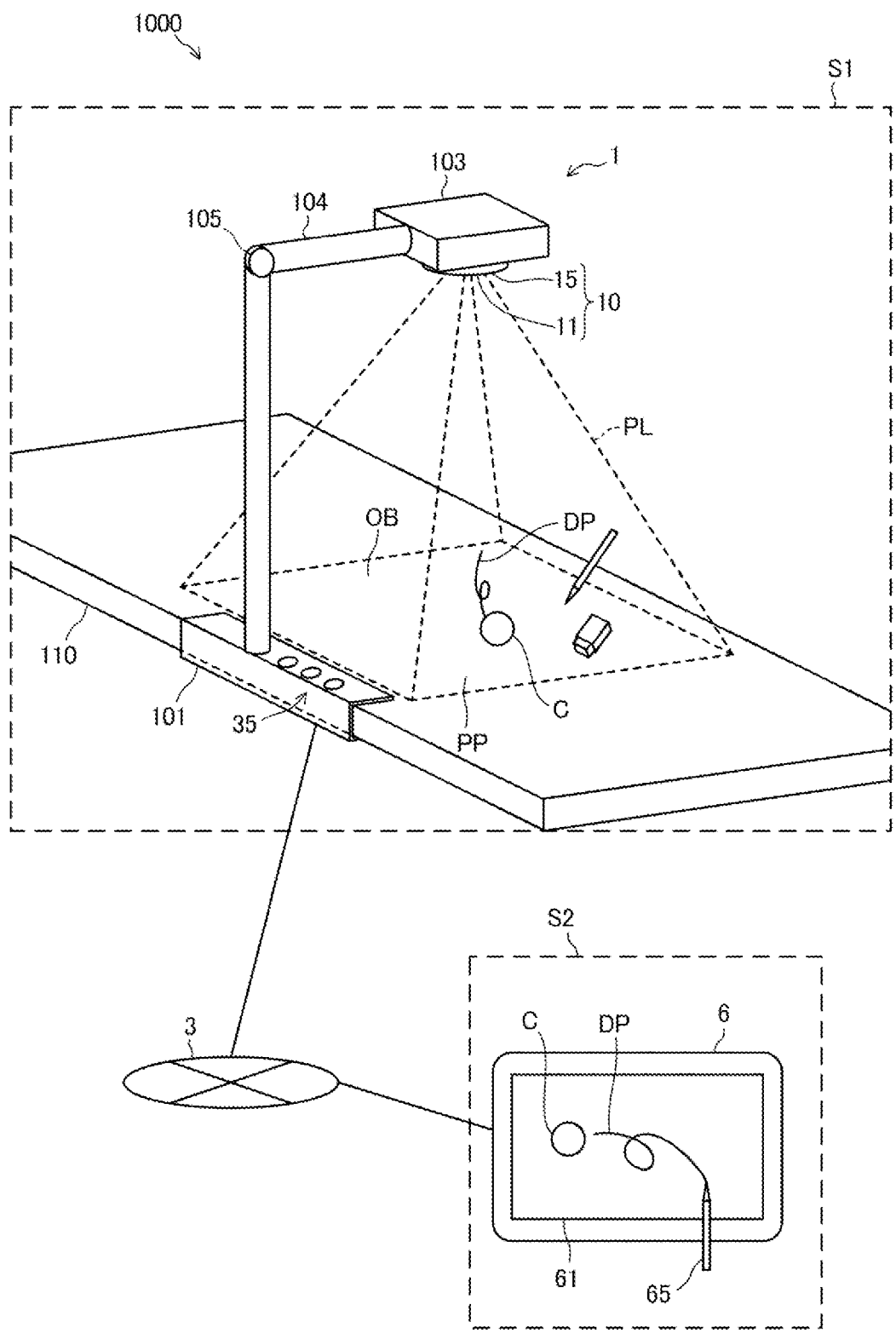
FIG. 1 is a view illustrating a general configuration of a projection system according to a first embodiment.

FIG. 1 is a view illustrating a general configuration of a projection system 1000 according to a first embodiment. The projection system 1000 includes a projection device 1 and a display device 6. The projection device 1 and the display device 6 are coupled to each other via a communication network 3 in a manner capable of data communication. The display device 6 corresponds to an example of an information processing device.

There is no restriction on the installation locations of the projection device 1 and the display device 6. For example, the usage location S1 of the projection device 1 and the usage location S2 of the display device 6 may be separate locations, or may be close to each other.

The communication network 3 is a network that enables data communication between apparatuses. The communication network 3 may be a local network such as a local area network (LAN), or may be a wide area network. Furthermore, the communication network 3 may be, for example, an open network such as the Internet. The communication network 3 may include a communication line such as a dedicated line, a public line network, and a cellular communication line, or a communication device such as a router and a gateway device. The projection device 1 and the communication network 3 may be wiredly connected to each other via a communication cable, or may be wirelessly connected to each other by a wireless communication path. Similarly, the display device 6 and the communication network 3 may be wiredly connected to each other via a communication cable, or may be wirelessly connected to each other by a wireless communication path. The communication cable is, for example, a LAN cable or a universal serial bus (USB) cable compliant with the USB communication standard. The wireless communication path is constituted by, for example, Wi-Fi or Bluetooth. Wi-Fi is a trade name. Bluetooth is a trade name.

The projection device 1 projects image light PL toward a projection target OB to form a projection image PP at the projection target OB. The projection device 1 projecting the image light PL is equivalent to displaying the projection image PP at the projection target OB. In the following description, an image encompasses video and a still image. Furthermore, the projection device 1 captures an image of a range including the projection target OB to generate a captured image.

The projection device 1 illustrated in FIG. 1 includes a fixing portion 101 that is in contact with an installation portion 110 such as a desk. The fixing portion 101 is fixed to the installation portion 110 by a clamp, a screw, a bolt, or an adhesive. In the example of FIG. 1, the fixing portion 101 is fixed sandwiching an end of the installation portion 110 having a plate shape. The surface of the installation portion 110 is a flat surface. This surface is used as the projection target OB of the projection device 1. The fixing portion 101 corresponds to an example of a pedestal portion.

The projection device 1 includes a projection unit 11 that projects the image light PL, and a optical unit 10 including an image-capturing unit 15 to be described later. With the fixing portion 101 fixed to the installation portion 110, the projection unit 11 projects the image light PL to the upper surface of the installation portion 110. The image-capturing unit 15 captures an image of a range including the projection target OB to which the image light PL is projected. The optical unit 10 is housed in an optical unit case 103. The optical unit case 103 is located above the projection target OB and projects the image light PL downward. The optical unit case 103 corresponds to an example of a projection unit case.

The optical unit case 103 is coupled to the fixing portion 101 by an arm 104. The arm 104 is a rod-shaped member supporting the optical unit case 103. The arm 104 includes one or more hinges 105. By bending the arm 104 at the hinges 105, the position of the optical unit case 103 relative to a projection target OB base 101 can be adjusted.

An operating panel 35 including a switch or the like used for operation of the projection device 1 is provided at the fixing portion 101.

The projection device 1 transmits a captured image obtained by capturing an image of a range including the projection target OB by the image-capturing unit 15 to the display device 6 via the communication network 3. Furthermore, the projection device 1 receives a drawing image DP from the display device 6 to be described later, and projects the received drawing image DP to the projection target OB.

The display device 6 is a device including a display 61. It is only required that the display device 6 is a device that includes the display 61, an input function, and a communication function. For example, the display device 6 is constituted by a tablet computer, a laptop computer, or a smartphone. The display device 6 described in the present embodiment has a function of detecting an operation of a pointer 65 relative to the display 61, and drawing the drawing image DP based on the operation by the pointer 65. The pointer 65 is, for example, a pen-shaped device as illustrated in FIG. 1. The display device 6 may be configured such that a hand or a finger of the user can be used as the pointer 65.

The configuration of the projection device 1 illustrated in FIG. 1 is an example. The projection device 1 may be installed, for example, in an orientation in which the image light PL is projected in the horizontal direction, or in an orientation in which the image light PL is projected upward.

Furthermore, examples of modes of use of the projection device 1 include distance education. For example, a student uses the projection device 1 at a usage location S1, and a teacher uses the display device 6 at a usage location S2. As illustrated in FIG. 1, for example, the projection device 1 captures an image of an opened notebook placed on the projection target OB with a graphic C written in pencil by the student, and transmits the captured image captured to the display device 6 of the teacher. The teacher corrects the graphic C that was written by the student and that is displayed on the display device 6. As the correction result, the teacher draws the drawing image DP by the pointer 65. The drawn drawing image DP is transmitted to the projection device 1. The projection device 1 receives the drawing image DP drawn by the teacher, and projects the drawing image DP to the projection target OB. In contrast, the image transmitted to the display device 6 by the projection device 1, that is, the image illustrating the graphic C written in pencil by the student at the projection target OB is not projected by the projection device 1. In response to the graphic C written in pencil by the student, the student can easily visually recognize and share the drawing image DP of the teacher as the correction result.

1-2. Configuration of Projection Device and Display Device

Figure 2:
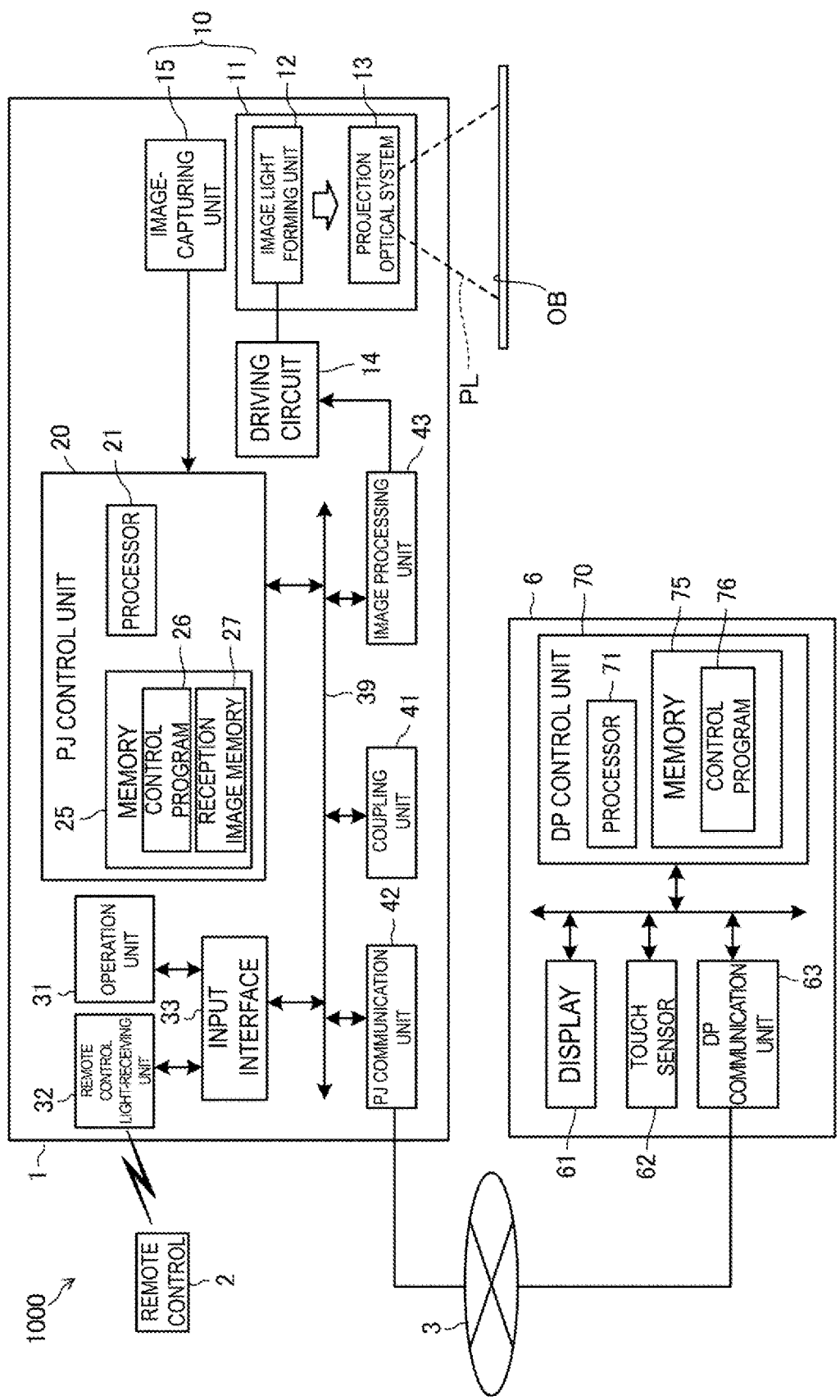
FIG. 2 is a block diagram of the respective devices constituting the projection system.

FIG. 2 is a block diagram of the respective devices constituting the projection system 1000.

The projection device 1 includes the projection unit 11 that projects the image light PL, and a driving circuit 14 that drives the projection unit 11. The projection unit 11 includes an image light forming unit 12 and a projection optical system 13.

The image light forming unit 12 generates the image light PL. The image light forming unit 12 includes light-emitting bodies that emit predetermined color light. The predetermined color light is, for example, red light, blue light, and green light. Examples of light-emitting bodies include, for example, light-emitting diode (LED) elements or organic LED (OLED) elements. The configuration of the image light forming unit 12 will be described later.

The image light forming unit 12 may include, for example, a lamp or a light source including a solid-state light source, and a light modulation device that modulates the light emitted by the light source. Examples of the lamp include, for example, halogen lamps, xenon lamps, or ultrahigh pressure mercury lamps. Examples of the solid-state light source include, for example, LEDs and laser light sources. Examples of the optical modulation device include, for example, transmissive liquid crystal panels, reflective liquid crystal panels, or digital micromirror devices (DMD).

The projection optical system 13 includes an optical element that guides the image light PL emitted by the image light forming unit 12 toward the projection target OB. The optical element includes one lens or a lens group including a plurality of lenses. The optical element may include a prism and a dichroic mirror.

The driving circuit 14 is coupled to an image processing unit 43 to be described later. The driving circuit 14 drives the image light forming unit 12 based on image signals input from the image processing unit 43, and thereby causes the image light PL to be formed. For example, the driving circuit 14 causes images to be formed by the image light forming unit 12 in frame units.

The projection device 1 includes the image-capturing unit 15. As will be described later, the image-capturing unit 15 is a digital camera including an imaging element 151. The image-capturing unit 15 performs image capturing under the control of a PJ control unit 20 to be described later, and outputs the generated captured image to the PJ control unit 20. The image-capturing range of the image-capturing unit 15 includes the direction in which the projection unit 11 projects the image light PL. For example, the image-capturing range of the image-capturing unit 15 includes the projection target OB. Examples of the imaging element 151 include, for example, complementary metal oxide semiconductor (CMOS) image sensors, or charge-coupled device (CCD) image sensors.

The projection unit 11 and the image-capturing unit 15 are disposed facing a visible surface of a desk or the like. Specifically, the projection unit 11 and the image-capturing unit 15 are housed in the optical unit case 103, and are located above the projection target OB. The projection unit 11 and the image-capturing unit 15 are collectively called the optical unit 10. The configuration of the optical unit 10 will be described later with reference to FIG. 3.

The projection device 1 includes a projection device control unit 20, an operation unit 31, a remote control light-receiving unit 32, an input interface 33, a coupling unit 41, a projection device communication unit 42, and an image processing unit 43. In the following description and drawings, a projection device may be abbreviated as PJ. For example, the projection device control unit 20 is spelled as the PJ control unit 20, and the projection device communication unit 42 is referred to as the PJ communication unit 42. The PJ control unit 20, the input interface 33, the coupling unit 41, the PJ communication unit 42, and the image processing unit 43 are coupled to each other via a bus 39 in a manner capable of data communication.

The operation unit 31 detects operations of the user to the projection device 1. The operation unit 31 detects an operation to a button or a switch included in the operating panel 35, generates an operation signal corresponding to the operation at the operating panel 35, and outputs the operation signal to the input interface 33. The input interface 33 includes a circuit that outputs operation signals input from the operation unit 31 to the PJ control unit 20.

The remote control light-receiving unit 32 includes a light-receiving element that receives infrared light. The remote control light-receiving unit 32 receives infrared signals transmitted from a remote control 2. When a switch (not illustrated) included in the remote control 2 is operated, the remote control 2 transmits an infrared signal indicating the operation. The remote control light-receiving unit 32 decodes the received infrared signal to generate an operation signal. The remote control light-receiving unit 32 outputs the generated operation signal to the input interface 33. The input interface 33 includes a circuit that outputs operation signals input from the remote control light-receiving unit 32 to the PJ control unit 20.

The specific aspect in which signals are transmitted and received between the remote control 2 and the remote control light-receiving unit 32 is not limited. The configuration in which the remote control 2 transmits infrared signals to the remote control light-receiving unit 32 is an example. For example, a configuration may be employed in which the remote control 2 and the remote control light-receiving unit 32 perform near-field wireless communication such as Bluetooth, and thereby transmit and receive signals.

The coupling unit 41 is an interface device that receives images from an external device. For example, the coupling unit 41 is coupled to a player or a personal computer that plays an optical disk recording medium.

The PJ communication unit 42 is coupled to the communication network 3, and transmits and receives images to and from the display device 6 via the communication network 3. For example, the PJ communication unit 42 is a communication device including a connector to which a communication cable is coupled, and a communication circuit that inputs and outputs signals by the communication cable. Furthermore, the PJ communication unit 42 may be a wireless communication device. In this case, the PJ communication unit 42 includes, for example, an antenna, a radio frequency (RF) circuit, a baseband circuit, and the like. The PJ communication unit 42 corresponds to an example of a communication unit.

The image processing unit 43 selects the image source under the control of the PJ control unit 20. The sources available to the projection device 1 is, for example, images received at the coupling unit 41, and images received at the PJ communication unit 42.

The image processing unit 43 performs image processing on an image of the selected source under the control of the PJ control unit 20. The image processing performed by the image processing unit 43 includes, for example, resolution conversion processing, geometric correction processing, digital zoom processing, and image correction processing for adjusting the tone or brightness of the image.

The image processing unit 43 generates an image signal based on the image-processed image, and outputs the image signal to the driving circuit 14. A frame memory (not illustrated) may be coupled to the image processing unit 43. In this case, the image processing unit 43 expands the image acquired from the source in the frame memory. The image processing unit 43 performs image processing on the image expanded in the frame memory.

The image processing unit 43 can be constituted by, for example, an integrated circuit. The integrated circuit includes, for example, a large-scale integration (LSI). More specifically, the image processing unit 43 includes an application-specific integrated circuit (ASIC), a programmable logic device (PLD), or the like. A PLD encompasses, for example, field-programmable gate arrays (FPGA). Furthermore, an analog circuit may be included in a part of the configuration of the integrated circuit, and a processor and an integrated circuit may be combined. The combination of a processor and an integrated circuit is called a microcontroller (MCU), an SoC (System-on-a-Chip), a system LSI, a chipset, and the like.

The PJ control unit 20 includes a processor 21 and a memory 25. The memory 25 is a storage device that stores a program executed by the processor 21 or data in a non-volatile manner. The memory 25 is constituted by a magnetic storage device, a semiconductor storage element such as a flash read-only memory (ROM), or any other type of non-volatile storage device. The memory 25 may include a random access memory (RAM) constituting the work area for the processor 21. The memory 25 stores data processed by the processor 21 and a control program 26 executed by the processor 21. The PJ control unit 20 corresponds to an example of a control unit.

The processor 21 is constituted by a central processing unit (CPU), a micro-processing unit (MPU), or the like. The processor 21 may be constituted by a single processor, or a plurality of processors may function as the processor 21. The processor 21 may be constituted by an SoC integrated with a part or all of the memory 25 and/or any other circuit. Furthermore, as described above, the processor 21 may be constituted by a combination of a CPU that executes a program and a digital signal processor (DSP) that executes predetermined arithmetic processing. All of the functions of the processor 21 may be implemented by hardware, or may be enabled using a programmable device. Furthermore, the processor 21 may have a function of the image processing unit 43. That is, the processor 21 may execute a function of the image processing unit 43.

The processor 21 controls the control program 26 stored in the memory 25 and thereby control the respective parts of the projection device 1.

The processor 21 causes the image processing unit 43 to select the source, and causes an image of the selected source to be acquired by the image processing unit 43. The processor 21 controls the driving circuit 14 to cause the image light PL to be projected by the projection unit 11 based on the image signal output by the image processing unit 43, and thereby causes an image to be displayed.

The memory 25 includes a reception image memory 27. The reception image memory 27 is a logical or virtual storage area that is provided utilizing a part of the storage area of the memory 25.

The PJ control unit 20 causes the image received from the display device 6 by the PJ communication unit 42 to be stored in the reception image memory 27. Each time an image is received from the display device 6, the PJ control unit 20 combines the received image with the image stored in the reception image memory 27, and thereby updates the image stored in the reception image memory 27. The PJ control unit 20 causes the image stored in the reception image memory 27 to be projected by the projection unit 11.

The processor 21 controls the image-capturing unit 15 to cause an image of a range including the projection target OB to be captured. The processor 21 transmits the captured image by the image-capturing unit 15 to the display device 6 by the PJ communication unit 42.

The projection device 1 is coupled, for example, to an external direct current (DC) power source. The projection device 1 includes a power source circuit that supplies the power supplied from the external DC power source to the respective parts including the optical unit 10 and the PJ control unit 20.

The display device 6 includes the display 61, a touch sensor 62, a display communication unit 63, and a display control unit 70. In the following description and drawings, the display may be abbreviated as DP. For example, the display communication unit 63 is spelled as the DP communication unit 63, and the display control unit 70 is referred to as the DP control unit 70. The display device 6 includes a battery (not illustrated), and operates by the power supplied from the battery.

The display 61 displays images under the control of the DP control unit 70. The display 61 includes, for example, a liquid crystal display panel, an organic electroluminescence (EL) display panel, or any other display panel.

The touch sensor 62 detects operations to the display panel of the display 61. The touch sensor 62 detects a contact operation or a pressing operation to the display 61, and outputs a signal indicating the operation position to the DP control unit 70. The touch sensor 62 is constituted by, for example, a pressure-sensitive sensor, a resistive film sensor, or a capacitance sensor. Furthermore, the touch sensor 62 may detect operations by performing wireless communication with the pointer 65. The touch sensor 62 may detect an operation at one position in the display panel of the display 61, or may be capable of simultaneously detecting operations to a plurality of positions in the display panel. The touch sensor 62 corresponds to an example of an operation unit.

The DP communication unit 63 is coupled to the communication network 3. The DP communication unit 63 transmits and receives data to and from the projection device 1 via the communication network 3. For example, the DP communication unit 63 is a communication device including a connector to which a communication cable is coupled, and a communication circuit that inputs and outputs signals by the communication cable. Furthermore, the DP communication unit 63 may be a wireless communication device. In this case, the DP communication unit 63 includes, for example, an antenna, an RF circuit, a baseband circuit, and the like.

The DP control unit 70 includes a processor 71 and a memory 75. The memory 75 is a storage device that stores a program executed by the processor 71 or data in a non-volatile manner. The memory 75 is constituted by a magnetic storage device, a semiconductor storage element such as a flash ROM, or any other type of non-volatile storage device. The memory 75 may include a RAM constituting the work area for the processor 71. The memory 75 stores data processed by the processor 71 or a control program 76 executed by the processor 71.

The processor 71 is constituted by a CPU, an MPU, or the like. The processor 21 may be constituted by a single processor, or a plurality of processors may function as the processor 71. The processor 71 may be constituted by an SoC integrated with a part or all of the memory 75 and/or any other circuit. Furthermore, as described above, the processor 71 may be constituted by a combination of a CPU that executes a program and a DSP that executes predetermined arithmetic processing. All of the functions of the processor 71 may be implemented by hardware, or may be implemented using a programmable device.

The processor 71 executes the control program 76 stored in the memory 75 and thereby control the respective parts of the display device 6.

The processor 71 causes the captured image transmitted by the projection device 1 to be received by the DP communication unit 63. The processor 71 causes the captured image received by the DP communication unit 63 to be displayed by the display 61.

The processor 71 accepts an operation detected by the touch sensor 62. The processor 71 generates a drawing image based on the accepted operation. The processor 71 generates a transmission image including the drawing image, and transmits the transmission image to the projection device 1 by the DP communication unit 63.

1-3. Configuration of Optical Unit

Figure 3:
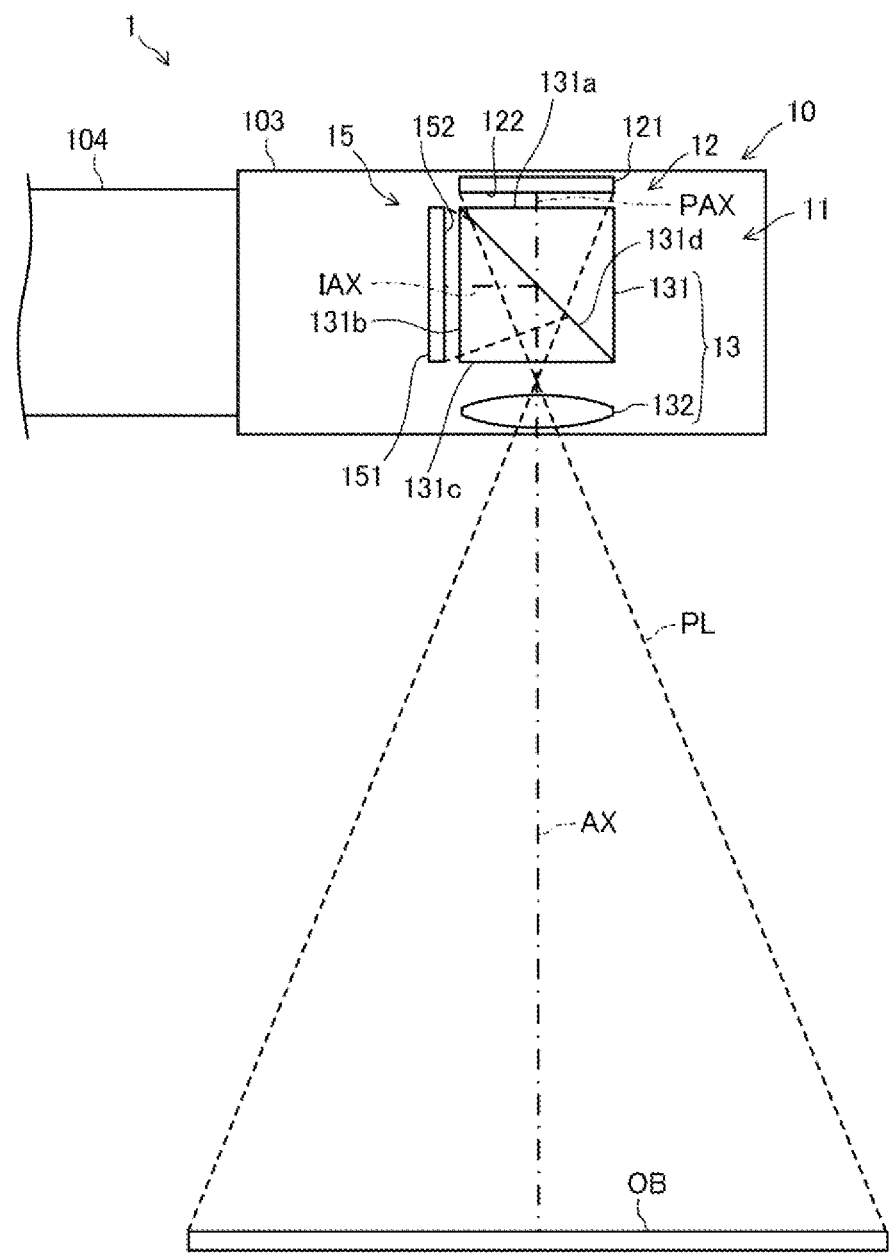
FIG. 3 is a view illustrating a configuration example of a main part of a projection device.

FIG. 3 is a view illustrating a configuration example of a main part of the projection device 1.

In the optical unit 10 illustrated in FIG. 3, the projection optical system 13 includes a dichroic prism 131 and a lens 132. The lens 132 is an optical component that causes the image light PL to form an image at the projection target OB.

The optical axis of the image light PL projected toward the projection target OB by the lens 132 is indicated by the reference sign AX. The optical axis AX is the central axis of the image light PL irradiated from the lens 132 to the projection target OB. The optical axis AX is a virtual axis that is through the optical center of the lens 132 and that is along the direction in which the image light PL is irradiated from the lens 132. The lens 132 may be a lens group constituted by a plurality of lenses.

The image light forming unit 12 includes a light-emitting element 121. The light-emitting element 121 has a configuration in which light-emitting bodies are disposed side by side in the light-emitting surface 122. The light-emitting bodies disposed in the light-emitting surface 122 include light-emitting bodies that emit red light, light-emitting bodies that emit blue light, and light-emitting bodies that emit green light. Because these light-emitting bodies are disposed in a matrix, the light-emitting element 121 emits the image light PL that forms an image from the light-emitting surface 122.

The light-emitting surface 122 faces the dichroic prism 131. The image light PL emitted by the light-emitting surface 122 is incident on the dichroic prism 131 along the optical axis AX, and passes through the dichroic prism 131 before being incident on the lens 132. The lens 132 irradiates the projection target OB with the image light PL transmitted through the dichroic prism 131. The optical axis of the image light PL emitted by the light-emitting surface 122 is referred to as the projection optical axis PAX. The projection optical axis PAX is the central axis of the image light PL emitted by the light-emitting element 121. The projection optical axis PAX is a virtual axis that is through the center of the region where the light-emitting bodies are disposed in the light-emitting surface 122 and that is perpendicular to the light-emitting surface 122. In the configuration of FIG. 3, the projection optical axis PAX coincides with the optical axis AX. In other words, the light-emitting element 121 is disposed on the optical axis AX of the projection optical system 13.

The image-capturing unit 15 includes the imaging element 151. The imaging element 151 is disposed facing the dichroic prism 131. In the imaging element 151, imaging elements are disposed side by side in the imaging surface 152 facing the dichroic prism 131. The image-capturing unit 15 includes photosensors disposed in the imaging surface 152. The image-capturing unit 15 performs image capturing by each of the photosensors receiving light incident from the dichroic prism 131. The imaging element 151 faces, in the dichroic prism 131, a surface different from the surface that the light-emitting element 121 faces. To put it in detail, the light-emitting element 121 is disposed so as to be aligned with the dichroic prism 131 in the direction along the optical axis AX. In contrast, the imaging element 151 faces the dichroic prism 131 at an angle of approximately 90 degrees relative to the optical axis AX.

In this way, the light-emitting element 121 is disposed facing a first surface 131*a* of the dichroic prism 131, and the imaging surface 152 is disposed facing a second surface 131*b* of the dichroic prism 131. The first surface 131*a* is on the optical axis AX and perpendicularly intersects the optical axis AX. The second surface 131*b* is generally parallel to the optical axis AX. That is, the first surface 131*a* forms an angle of 90 degrees with the second surface 131*b*.

The dichroic prism 131 is an example of a separation optical member that separates light emitted by the light-emitting element 121 and light incident on the dichroic prism 131 from the projection target OB. The dichroic prism 131 includes, for example, a semi-reflective surface 131*d* therein. The dichroic prism 131 transmits the light emitted by the light-emitting element 121 and causes the light to be incident on the lens 132 along the optical axis AX. Furthermore, the dichroic prism 131 reflects light incident on a third surface 131*c* of the dichroic prism 131 from the lens 132 toward the imaging element 151 by the semi-reflective surface 131*d*.

The semi-reflective surface 131*d* of the dichroic prism 131 includes, for example, a polarization separation film. In this case, the dichroic prism 131 transmits P-polarized light and reflects S-polarized light, for example. As a result, the dichroic prism 131 separates the light emitted by the light-emitting element 121 and the light incident on the dichroic prism 131 from the projection target OB by the semi-reflective surface 131*d*.

The semi-reflective surface 131*d* of the dichroic prism 131 may include, for example, a wavelength separation film. The wavelength separation film can also be called the wavelength selection filter. In this case, the semi-reflective surface 131*d* transmits light in a specific wavelength region, and reflects light in the other wavelength regions, for example. As a result, the dichroic prism 131 separates the light emitted by the light-emitting element 121 and the light incident on the dichroic prism 131 from the projection target OB by the semi-reflective surface 131*d*.

The semi-reflective surface 131*d* of the dichroic prism 131 may include, for example, a semi-transmissive film. In this case, the dichroic prism 131 transmits light incident on the first surface 131*a*, and reflects light incident on the third surface 131*c* by the semi-reflective surface 131*d*, for example.

The optical axis of the light reflected by the dichroic prism 131 toward the imaging element 151 is indicated by the reference sign IAX. The image-capturing optical axis IAX is the central axis of the light from the dichroic prism 131 toward the imaging element 151. The image-capturing optical axis IAX is the axis of the light received by the imaging element 151 at the imaging surface 152. The image-capturing optical axis IAX is a virtual axis perpendicular to the imaging surface 152. In other words, the imaging element 151 is disposed such that the center of the imaging surface 152 coincides with the image-capturing optical axis IAX.

The image-capturing optical axis IAX coincides with the optical axis AX between the projection target OB and the semi-reflective surface 131*d*. The image-capturing optical axis IAX is bent by approximately 90 degrees at the semi-reflective surface 131*d*. That is, in the region closer to the projection target OB than the semi-reflective surface 131*d*, the projection optical axis PAX and the image-capturing optical axis IAX coincide with each other. In this way, in the optical unit 10, the projection unit 11 and the image-capturing unit 15 are optically coaxially disposed. Accordingly, the projection unit 11 and the image-capturing unit 15 each perform projection and image capturing on the same axis.

FIG. 3 is a schematic view of a configuration of a main part of the projection device 1. The optical unit 10 may include a member not illustrated in FIG. 3. For example, the projection optical system 13 may include an optical element different from the dichroic prism 131 and the lens 132. Specifically, the projection optical system 13 may include a light-guiding element between the dichroic prism 131 and the lens 132. Furthermore, a configuration may be employed in which a polarization separation element and a polarization conversion element are provided between the light-emitting element 121 and the dichroic prism 131, and the image light PL incident on the dichroic prism 131 is aligned with the P-polarized light.

1-4. Operation of Projection System

Figure 4:
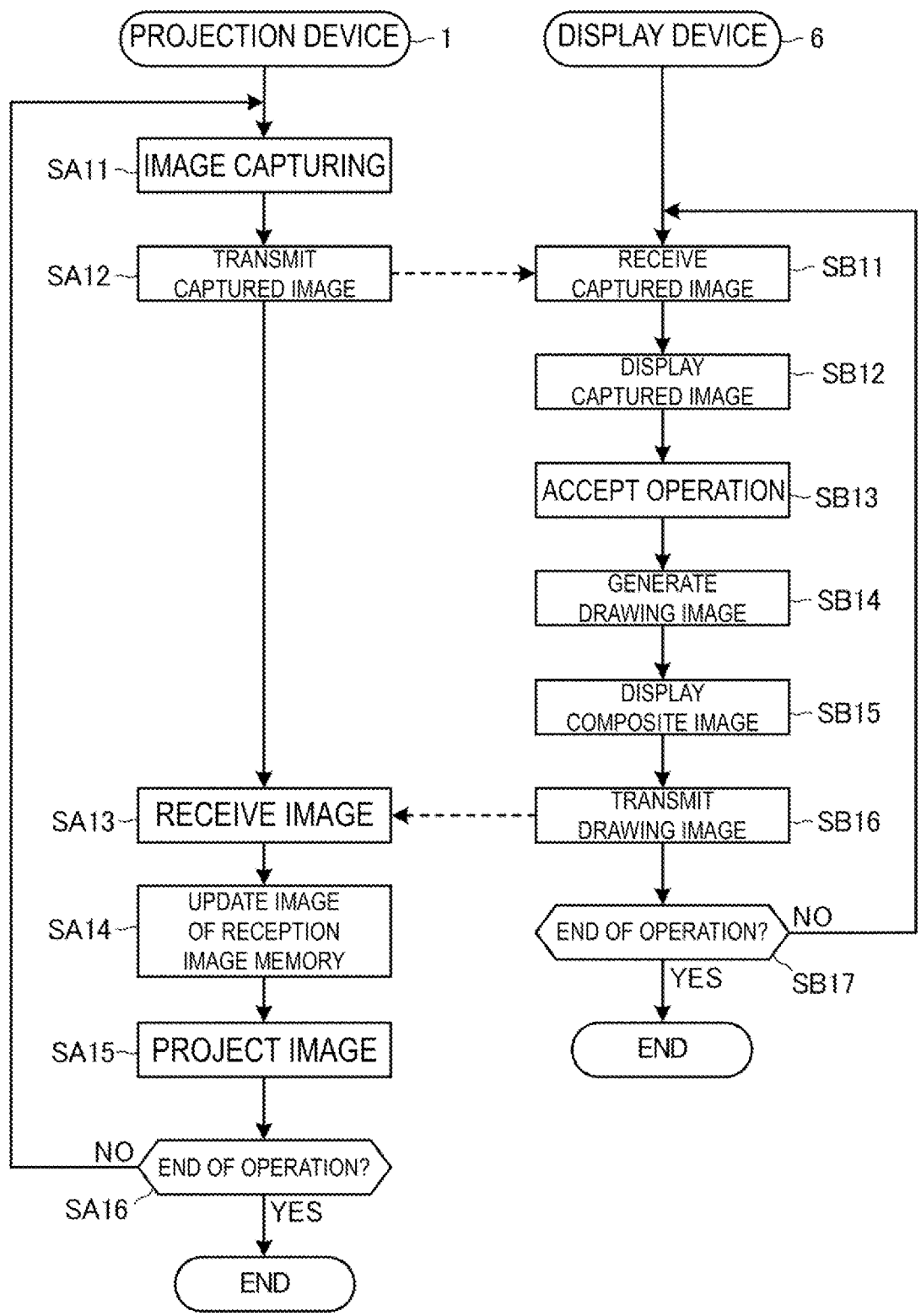
FIG. 4 is a sequence diagram illustrating an operation of the projection system.
Figure 5:
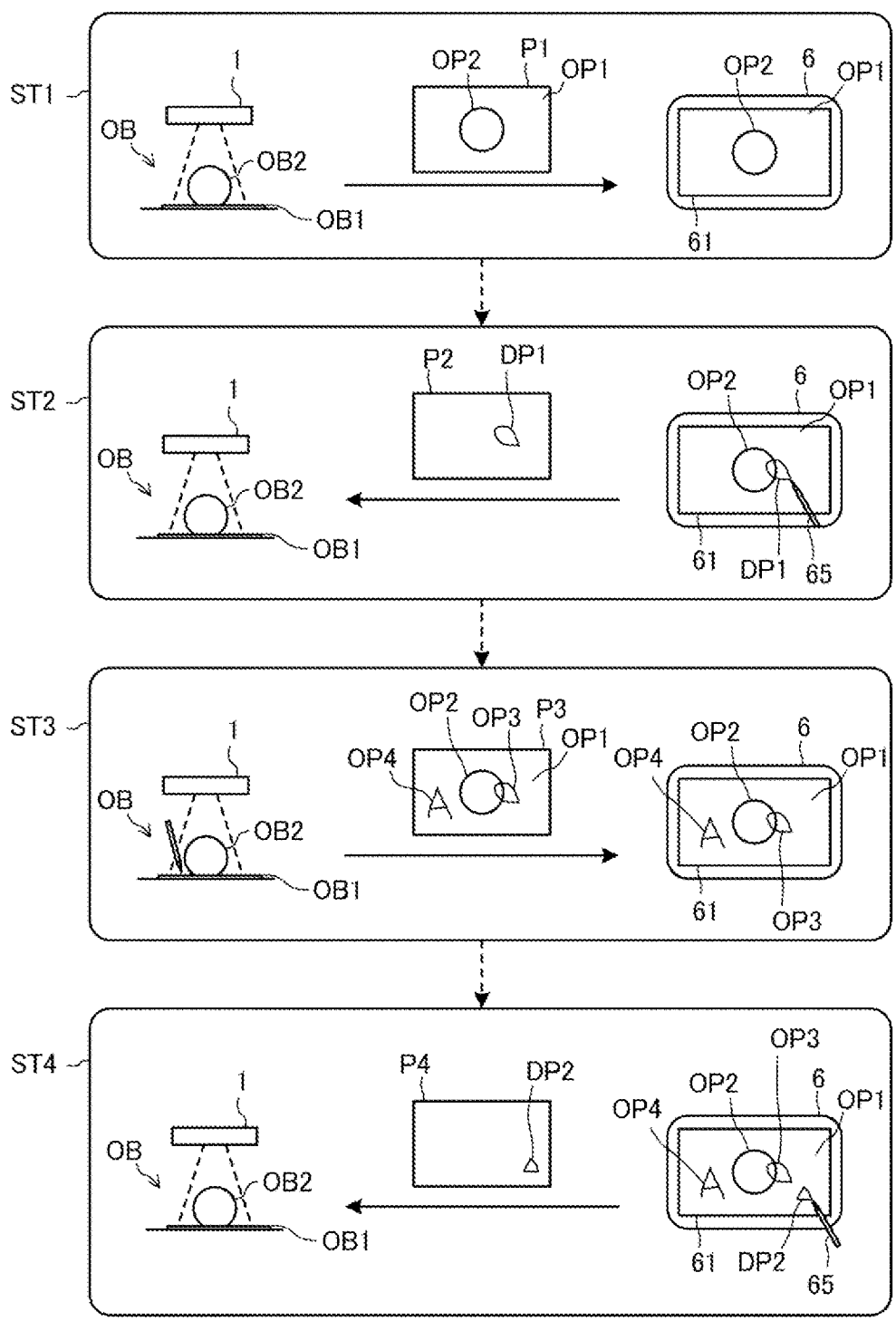
FIG. 5 is a schematic view of an operation of the projection system.

FIG. 4 is a sequence diagram illustrating an operation of the projection system 1000. FIG. 5 is a schematic view of an operation of the projection system 1000. The operation of the projection system 1000 will be described with reference to these figures.

In FIG. 4, the processing of steps SA11 to SA16 are executed by the PJ control unit 20 of the projection device 1, and the processing of steps SB11 to SB17 are executed by the DP control unit 70 of the display device 6.

In step SA11, the projection device 1 captures an image of a range including the projection target OB to generate a captured image. In step SA12, the projection device 1 transmits the captured image to the display device 6.

The display device 6 receives, in step SB11, the captured image transmitted by the projection device 1. The display device 6 displays, in step SB12, the received captured image on the display 61.

Here, when an operation by the pointer 65 is detected, the display device 6 accepts that operation in step SB13. In step SB14, the display device 6 generates a drawing image based on the operation accepted in step SB13. For example, the drawing image is a curved line or straight line trajectory in which the indicator 65 is moved.

In step SB15, the display device 6 overlays the drawing image generated in step SB14 on the captured image displayed in step SB12 to generate a composite image, and causes the composite image to be displayed on the display 61.

In step SB16, the display device 6 transmits the drawing image generated in step SB14 to the projection device 1, and then proceeds to step SB17.

The projection device 1 receives the image transmitted by the display device 6 in step SA13. The image transmitted by the display device 6 and received by the projection device 1 includes the drawing image generated by the display device 6.

The projection device 1 updates, in step SA14, the image of the reception image memory 27 based on the image received. To put it in detail, the projection device 1 combines the image stored in the reception image memory 27 with the image received in step SA13, and thereby generates a composite image. The projection device 1 stores the composite image in the reception image memory 27 and thereby updates the image in the reception image memory 27.

The projection device 1 proceeds to step SA15, causes the updated image of the reception image memory 27 to be projected to the projection target OB by the projection unit 11, and then proceeds to step SA16. The image projected by the projection device 1 to the projection target OB includes a composite image.

The projection device 1 determines, in step SA16, whether the operation is to be ended. If it is determined that the operation is to be ended (step SA16; YES), such as when an operation instructing the end of operation is detected by the input interface 33, the projection device 1 ends the present processing. If it is determined that the operation is not to be ended (step SA16; NO), the projection device 1 returns to step SA11.

After transmitting the image to the projection device 1, the display device 6 determines, in step SB17, whether the operation is to be ended. If it is determined that the operation is to be ended (step SB17; YES), such as when an operation instructing the end of operation is detected by the touch sensor 62, the display device 6 ends the present processing. If it is determined that the operation is not to be ended (step SB17; NO), the display device 6 returns to step SB11.

FIG. 5 illustrates operation states ST1, ST2, ST3, and ST4 of the projection system 1000.

States in which the projection target OB of the projection device 1 includes a sheet OB1 and an object OB2 are illustrated as examples. The sheet OB1 is a flat sheet such as paper. The user using the projection device 1 can write a character or a graphic on the sheet OB1 by a writing instrument such as a pencil.

Examples of modes of use of the projection system 1000 include distance education. For example, a student uses the projection device 1 at a usage location S1, and a teacher uses the display device 6 at a usage location S2. The student places an opened notebook or teaching material on the projection target OB, and the projection device 1 projects the projection image PP on the notebook or the teaching material. That is, the sheet OB1 is a notebook or a teaching material. Furthermore, when the student writes a character or a graphic on the notebook or the teaching material by a writing instrument, the projection device 1 captures an image of this character or graphic, and transmits the generated captured image to the display device 6. The teacher grasps the student's answer or the like from the character or graphic of the captured image displayed on the display 61. The teacher corrects the answer or the like utilizing the pointer 65. When the teacher performs input utilizing the pointer 65, the display device 6 generates a drawing image in response to the input. The display device 6 transmits the drawing image based on the input of the teacher to the projection device 1. In addition, the projection device 1 then projects the received drawing image to the projection target OB. As a result, the student using the projection device 1 can clearly visually recognize the drawing image, which is the correction made by the teacher in the display device 6, on the notebook or the teaching material that is the projection target OB.

In the state ST1, the projection device 1 transmits the captured image generated by capturing an image of the sheet OB1 and the object OB2 as a first image P1 to the display device 6. The first image P1 includes an object image OP2 that is a captured image of the object OB2. Furthermore, the entire first image P1 includes an object image OP1 that is a captured image of the sheet OB1.

The display device 6 receives the first image P1 and displays the first image P1 on the display 61. The object image OP1 is displayed on the display 61.

The state ST2 is a state in which an operation by the pointer 65 has been performed in the display device 6. The display device 6 generates a first drawing image DP1 based on the operation of the pointer 65. The display device 6 displays the first drawing image DP1 on the display 61, and transmits a second image P2 including the first drawing image DP1 to the projection device 1. The object images OP1 and OP2 are not included in the second image P2.

The projection device 1 receives the second image P2. The projection device 1 stores the received second image P2 in the reception image memory 27. If an image is already stored in the reception image memory 27, the projection device 1 updates the image stored in the reception image memory 27.

The state ST3 is a state in which a graphic has been written on the sheet OB1 by a writing instrument in the projection device 1. The projection device 1 generates a captured image by capturing an image of the projection target OB, and transmits the captured image as a third image P3 to the display device 6.

The third image P3 includes: the object image OP1 that is an image of the sheet OB1; the object image OP2 that is an image of the object OB2; an object image OP3; and an object image OP4. The object image OP3 is an image obtained when the image-capturing unit 15 captures an image of the first drawing image DP1 projected to the projection target OB by the projection unit 11. The object image OP4 is a captured image of a drawn figure written on the sheet OB1 by a writing implement.

The display device 6 receives the third image P3 and displays the third image P3 on the display 61. The object images OP1, OP2, OP3, and OP4 included in the third image P3 are displayed on the display 61. When displaying the third image P3, the display device 6 switches the image that was displayed on the display 61 until then to the third image P3. Thus, the display of the first drawing image DP1 displayed in the state ST2 is stopped.

The state ST4 is a state in which an operation by the pointer 65 has been performed in the display device 6. The display device 6 generates a second drawing image DP2 based on the operation of the pointer 65. The display device 6 transmits a fourth image P4 including the second drawing image DP2 to the projection device 1.

The projection device 1 receives the fourth image P4, and updates the image stored in the reception image memory 27 based on the fourth image P4. After receiving the second image P2, the reception image memory 27 stores the first drawing image DP1 included in the second image P2. After receiving the fourth image P4, the projection device 1 adds the second drawing image DP2 included in the fourth image P4 to the image stored in the reception image memory 27. As a result, the image stored in the reception image memory 27 is updated to an image in which the first drawing image DP1 and the second drawing image DP2 are superimposed on each other. The projection device 1 projects the image stored in the reception image memory 27 to the projection target OB. As a result, the first drawing image DP1 and the second drawing image DP2 are projected to the projection target OB.

The first image P1 is an example of a captured image and a transmission image of the projection device 1, and is an example of a reception image of the display device 6. The second image P2 is an example of a transmission image of the display device 6, and is an example of a reception image and a projection image of the projection device 1. The third image P3 is an example of a captured image and a transmission image of the projection device 1, and is an example of a reception image of the display device 6. The fourth image P4 is an example of a transmission image of the display device 6, and is an example of a reception image and a projection image of the projection device 1. The first drawing image DP1 and the second drawing image DP2 are examples of drawing images generated in the display device 6 based on the operation of the pointer 65.

Characteristics of the operation illustrated in FIG. 5 include that, when the display device 6 receives the third image P3, the display device 6 displays the third image P3 on the display 61 and stops the display of the first drawing image DP1, and that the projection device 1 updates the image of the reception image memory 27.

For example, in the state ST3, when the display device 6 causes the third image DP3 to be displayed on the display 61 while the first drawing image DP1 is displayed on the display 61, the object image OP3 and the first drawing image DP1 are displayed overlaid on each other at the same position. The object image OP3 is an image obtained by capturing an image of the first drawing image DP1 projected by the projection device 1. Thus, the object image OP3 is an image having the same shape as that of the first drawing image DP1. However, the position, shape, and size of the object image OP3 and those of the first drawing image DP1 are likely not to completely match. Examples of the factors behind this include the impact of the ambient light of the projection device 1, and the difference between the resolution of the projection image of the projection unit 11 and the resolution of the captured image of the image-capturing unit 15.

When the object image OP3 and the first drawing image DP1 do not match, the display of the display 61 can be disturbed due to the difference between the object image OP3 and the first drawing image DP1. For example, a line constituting the object image OP3 and a line constituting the first drawing image DP1 may be displayed as a double line. Furthermore, for example, a line constituting the object image OP3 and a line constituting the first drawing image DP1 may be displayed in an interference fringe-like state. The display of these causes deterioration in display quality, and is a factor that deteriorates the visibility of the object image OP3 and the first drawing image DP1.

In particular, as illustrated in FIG. 3, when a configuration is employed in which the projection optical axis PAX of the projection unit 11 and the image-capturing optical axis IAX of the image-capturing unit 15 are the same axis, that is, coaxial, the difference between the position and size of the object image OP3 and those of the first drawing image DP1 is very small. Thus, a phenomenon in which a line constituting the object image OP3 and a line constituting the first drawing image DP1 are displayed in an interference fringe-like state is prone to occur.

In the present embodiment, when the display device 6 displays the third image P3 on the display 61, the display of the first drawing image DP1 is ended. Specifically, after receiving the third image P3 including the object image OP3 corresponding to the first drawing image DP1, the display device 6 does not display the first drawing image DP1 on the display 61. The same applies to the second drawing image DP2. As a result, the first drawing image DP1 and the object image OP3 are not displayed overlaid on each other. Accordingly, deterioration in display quality of the image displayed on the display 61 can be prevented.

In addition, the projection device 1 stores the first drawing image DP1 included in the second image P2 and the second drawing image DP2 included in the fourth image P4 in the reception image memory 27. Thus, the projection device 1 can project the first drawing image DP1 and the second drawing image DP2, which are a plurality of drawing images generated at different points in time. Accordingly, there is an advantage that the drawing image drawn by the user using the display device 6 is not caused to disappear.

1-5. Action of Embodiments

As described above, the projection device 1 described in the first embodiment includes the projection unit 11 that projects the image light PL to the projection target OB, and the image-capturing unit 15 that captures an image of a range including the projection target OB to generate a captured image. The projection device 1 includes the PJ communication unit 42, and the PJ control unit 20 that transmits the captured image to the display device 6 by the PJ communication unit 42 and that causes a reception image received by the PJ communication unit 42 from the display device 6 to be projected by the projection unit 11. The projection unit 11 includes the image light forming unit 12 that forms the image light PL, and the projection optical system 13 that projects the image light PL formed by the image light forming unit 12 toward the projection target OB. The image-capturing unit 15 includes the imaging element 151 that receives light through the projection optical system 13. The PJ control unit 20 receives, by the PJ communication unit 42, the reception image including the image drawn by the display device 6.

As a result, the projection device 1 projects the image received from the display device 6 to the projection target OB by the projection unit 11, captures an image of the projection target OB, and transmits to the display device 6. Thus, the user using the projection device 1 can share, with the user using the display device 6, the state of the projection target OB and the information included in the display device 6.

The image-capturing unit 15 performs image capturing by receiving light focused by the lens 132 included in the projection optical system 13. Thus, the lens 132 that projects the image light PL can be utilized for image capturing by the image-capturing unit 15. Accordingly, the projection device 1 can have a compact configuration. Moreover, the projection optical axis PAX on which the projection unit 11 projects the image light PL and the image-capturing optical axis IAX on which the image-capturing unit 15 performs image capturing can be brought close to each other. Thus, distortion caused when the image-capturing unit 15 captures an image of the projection image PP formed on the projection target OB by the image light PL can be suppressed. Accordingly, the state of the projection target OB can be shared between the display device 6 and the projection device 1 by high-quality images. For example, when the projection system 1000 is utilized for distance education as described above, the teacher using the display device 6 can check the state of the projection target OB of the projection device 1 used by the student by images having less distortion, and thus distance education can be smoothly performed.

In the projection device 1, the projection optical system 13 includes a separation optical member that separates light incident from the projection target OB from the image light PL and guides the separated light to the imaging element. The separation optical member is, for example, the dichroic prism 131. According to this configuration, a configuration can be realized in which the projection unit 11 and the image-capturing unit 15 each perform projection and image capturing by utilizing the common lens 132. When the separation optical member is utilized, the image-capturing unit 15 is less susceptible to the image light PL of the projection portion 11, and thus high-quality captured images can be obtained.

The dichroic prism 131 that is the separation optical member includes, for example, a polarization separation film that separates light by polarization. In this case, the image light PL radiated by the projection unit 11 and the outside light to be received by the image-capturing unit 15 can be efficiently separated.

The dichroic prism 131 that is the separation optical member may include, for example, a wavelength separation film that separates light having different wavelengths. In this case, the image light PL and the outside light to be received by the image-capturing unit 15 can be selectively separated in accordance with wavelengths. In this case, a configuration may be employed in which the image-capturing unit 15 detects light in a wavelength region outside the visible region such as infrared light and ultraviolet light by the image-capturing element 151, and the projection device 1 generates a monochrome captured image. According to this configuration, the wavelength separation film allows the outside light of which an image is captured by the image-capturing unit 15 and the image light PL to be more reliably separated, and the impact of the image light PL on image capturing of the image-capturing unit 15 to be efficiently suppressed.

Furthermore, the dichroic prism 131 that is the separation optical member may include a semi-transmissive film.

The projection device 1 includes the fixing portion 101 and the optical unit case 103 coupled to the fixing portion 101. The projection unit 11 and the image-capturing unit 15 are housed in the optical unit case 103. As a result, taking advantage of the configuration in which the projection unit 11 and the image-capturing unit 15 utilize the common lens 132, the projection device 1 can have a smaller configuration. Thus, the projection device 1 can be installed in a limited space such as on a desk. This is suitable when the projection device 1 is utilized for distance education, for example.

The projection device 1 includes the reception image memory 27 that stores an image included in the reception image. When receiving the reception image from the display device 6, the projection device 1 updates the image stored in the reception image memory 27 based on the reception image received, and projects the updated image stored in the reception image memory by the projection unit 11. According to this configuration, when the projection device 1 projects the reception image received from the display device 6 to the projection target OB, states in which the sheet OB1 or the object OB2 that are actual objects installed on the projection target OB and the captured image of the sheet OB1 or the object OB2 overlap each other can be avoided. Thus, the visibility of the sheet OB1, the object OB2, and the projection image PP in the projection target OB does not deteriorate, and the projection device 1 can be used in good condition.

Furthermore, the projection device 1 includes the projection unit 11 that projects the image light PL to the projection target OB, the image-capturing unit 15 that captures an image of a range including the projection target OB to generate a captured image, the PJ communication unit 42 that communicates with the display device 6, and the PJ control unit 20. The PJ control unit 20 performs control so that the captured image is transmitted to the display device 6 and a drawing image is received from the display device 6 by the PJ communication unit 42, the drawing image is projected to the projection target OB by the projection unit 11, and the captured image is kept from being projected.

As a result, the projection device 1 projects the image received from the display device 6 to the projection target OB by the projection unit 11, and transmits a captured image obtained by capturing an image of the projection target OB to the display device 6. Thus, the user using the projection device 1 can share, with the user using the display device 6, the state of the projection target OB and the information included in the display device 6. Here, the projection device 1 does not capture any image of the captured image by the projection unit 11. Thus, an image or an object formed by handwriting or the like in the projection target OB, and the image light PL including an image obtained by capturing an image of such an image or such an object by the image-capturing unit 15 do not overlap each other in the projection target OB. As a result, the situation in which a projection image projected to the projection target OB and an image or an object that are actual objects overlap each other to impair the visibility can be avoided. Thus, the user using the projection device 1 can share images with the display device 6 in a good environment.

In a method for controlling the projection device 1, by the PJ communication unit 42, the captured image generated by the image-capturing unit 15 is transmitted as the first image to the display device 6, and the second image including the first drawing image drawn relative to the first image in the display device 6 is received. Furthermore, by the projection unit 11, the first drawing image is projected to the projection target OB; by the image-capturing unit 15, an image of a range including the projection target OB to which the first drawing image is projected is captured to generate a captured image; and by the PJ communication unit 42, the captured image is transmitted as the third image to the display device 6. Furthermore, the fourth image including the second drawing image drawn relative to the third image in the display device 6 is received and, by the projection unit 11, the first drawing image and the second drawing image are projected to the projection target OB.

As a result, the projection device 1 projects the image received from the display device 6 to the projection target OB by the projection unit 11, and transmits a captured image obtained by capturing an image of the projection target OB to the display device 6. Thus, the user using the projection device 1 can share, with the user using the display device 6, the state of the projection target OB and the information included in the display device 6.

2. Second Embodiment

Figure 6:
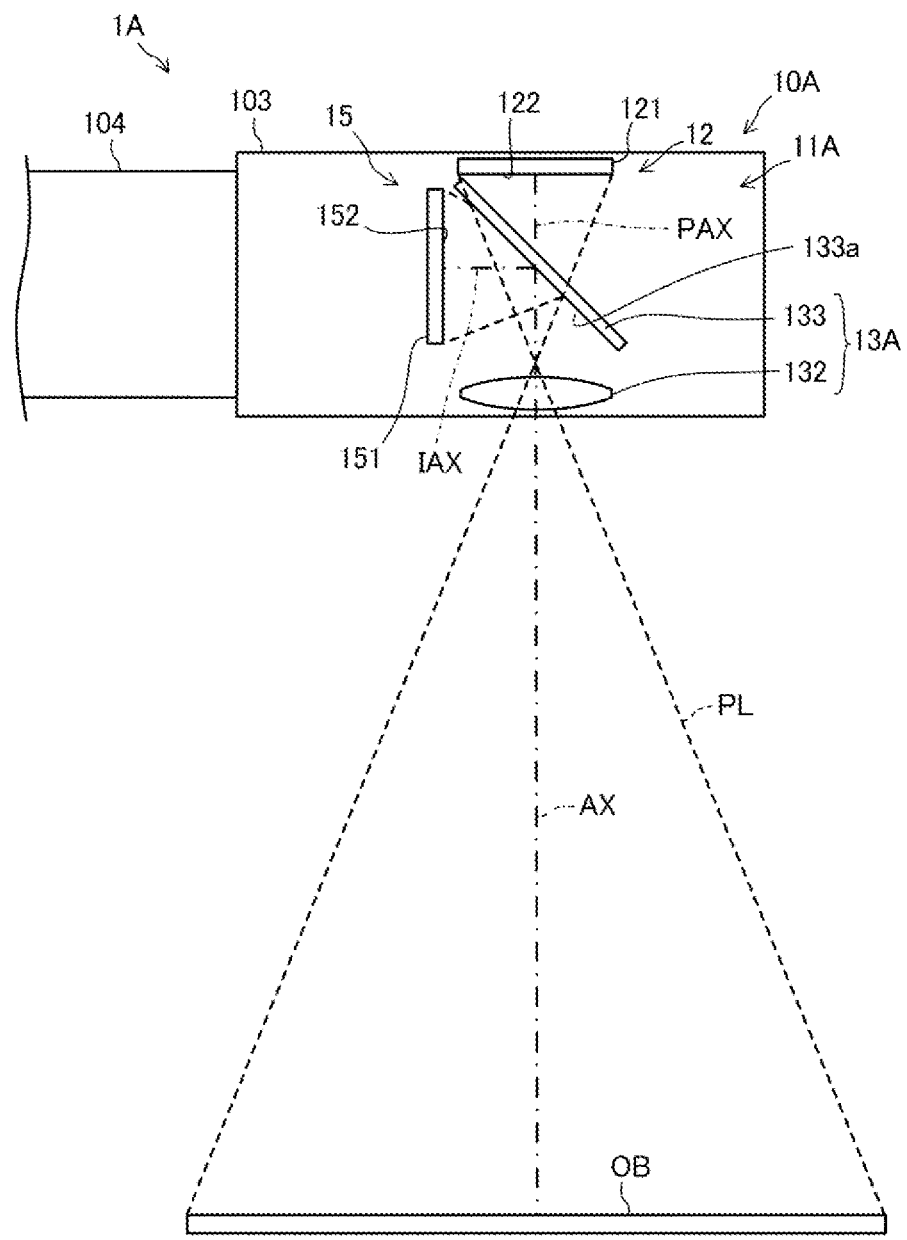
FIG. 6 is a view illustrating another configuration example of a main part of a projection device according to a second embodiment.

FIG. 6 is a view illustrating a configuration example of a main part of a projection device 1A according to a second embodiment. In the description of the projection device 1A, configurations common to the projection device 1 described in the first embodiment are denoted by the same reference signs, and the description thereof is omitted. Similar to the projection device 1, the projection device 1A is coupled to the display device 6 via the communication network 3, and thereby constitutes the projection system 1000.

In place of the optical unit 10 included in the projection device 1, the projection device 1A includes an optical unit 10A illustrated in FIG. 6. Except for the optical unit 10A, the configuration of the projection device 1A is common with that of the projection device 1.

The optical unit 10A includes a projection unit 11A and the image-capturing unit 15. The projection unit 11A includes the image light forming unit 12 and a projection optical system 13A. In the configuration of the projection optical system 13 of the optical unit 10, the projection optical system 13A includes a dichroic mirror 133 in place of the dichroic prism 131. The lens 132, the light-emitting element 121, and the imaging element 151, which represent the other configurations, can have the configuration common with that of the optical unit 10. The lens 132 of FIG. 6 may be identical to the lens 132 illustrated in FIG. 3, or may have a different configuration.

Instead of the dichroic prism 131 included in the optical unit 10, the optical unit 10A includes the dichroic mirror 133. The dichroic mirror 133 is an example of a separation optical member that separates light emitted by the light-emitting element 121 and light incident on the dichroic mirror 133 from the projection target OB. Similar to the semi-reflective surface 131d included in the dichroic prism 131, the dichroic mirror 133 transmits the light emitted by the light-emitting element 121 while reflecting the light incident on the dichroic mirror 133 from the lens 132 toward the imaging element 151.

The dichroic mirror 133 includes, for example, a polarization separation film. In this case, the dichroic mirror 133 transmits P-polarized light and reflects S-polarized light, for example. The dichroic mirror 133 may include, for example, a wavelength separation film. In this case, the semi-reflective surface 131d transmits light in a specific wavelength region, and reflects light in the other wavelength regions, for example. The dichroic mirror 133 may include, for example, a semi-transmissive film.

Similar to the configuration example of FIG. 3, the optical axis of the light reflected by the dichroic mirror 133 toward the imaging element 151 is the image-capturing optical axis IAX. The image-capturing optical axis IAX is a virtual axis perpendicular to the imaging surface 152.

The optical axis of the light reflected by the dichroic prism 131 toward the imaging element 151 is indicated by the reference sign IAX. The image-capturing optical axis IAX is the central axis of the light from the dichroic prism 131 toward the imaging element 151. The image-capturing optical axis IAX is the axis of the light received by the imaging element 151 at the imaging surface 152. The image-capturing optical axis IAX is a virtual axis perpendicular to the imaging surface 152. In other words, the imaging element 151 is disposed such that the center of the imaging surface 152 coincides with the image-capturing optical axis IAX.

In this way, the optical unit 10A includes the dichroic mirror 133 as the separation optical member. Similar to the dichroic prism 131, the dichroic mirror 133 separates the image light PL emitted by the projection unit 11 and the outside light detected by the image-capturing unit 15. Thus, since it includes the optical unit 10A, the projection device 1A provides action and effects similar to those of the projection device 1.

The image-capturing unit 15 performs image capturing by receiving light focused by the lens 132 included in the projection optical system 13. Thus, the lens 132 that projects the image light PL can be utilized for image capturing by the image-capturing unit 15. Accordingly, the projection device 1A can have a compact configuration. Moreover, the projection optical axis PAX on which the projection unit 11A projects the image light PL and the image-capturing optical axis IAX on which the image-capturing unit 15 performs image capturing can be brought close to each other. Thus, distortion caused when the image-capturing unit 15 captures an image of the projection image PP formed on the projection target OB by the image light PL can be suppressed. Accordingly, the state of the projection target OB can be shared between the display device 6 and the projection device 1A by high-quality images.

The dichroic mirror 133 that is the separation optical member includes, for example, a polarization separation film that separates light by polarization. In this case, the image light PL radiated by the projection unit 11 and the outside light to be received by the image-capturing unit 15 can be efficiently separated. The dichroic mirror 133 that is the separation optical member may include, for example, a wavelength separation film that separates light having different wavelengths. In this case, the image light PL and the outside light to be received by the image-capturing unit 15 can be selectively separated in accordance with wavelengths. In this case, a configuration may be employed in which the image-capturing unit 15 detects light in a wavelength region outside the visible region such as infrared light and ultraviolet light by the image-capturing element 151, and the projection device 1A generates a monochrome captured image. According to this configuration, the wavelength separation film allows the outside light of which an image is captured by the image-capturing unit 15 and the image light PL to be more reliably separated, and the impact of the image light PL on image capturing of the image-capturing unit 15 to be efficiently suppressed. Furthermore, the dichroic mirror 133 that is the separation optical member may include a semi-transmissive film.

In addition, a configuration can be employed in which, similar to the projection device 1, the projection device 1A includes the fixing portion 101 and the optical unit case 103 coupled to the fixing portion 101, and the projection unit 11A and the image-capturing unit 15 are housed in the optical unit case 103. As a result, taking advantage of the configuration in which the projection unit 11A and the image-capturing unit 15 utilize the common lens 132, the projection device 1A can have a smaller configuration.

3. Third Embodiment

Figure 7:
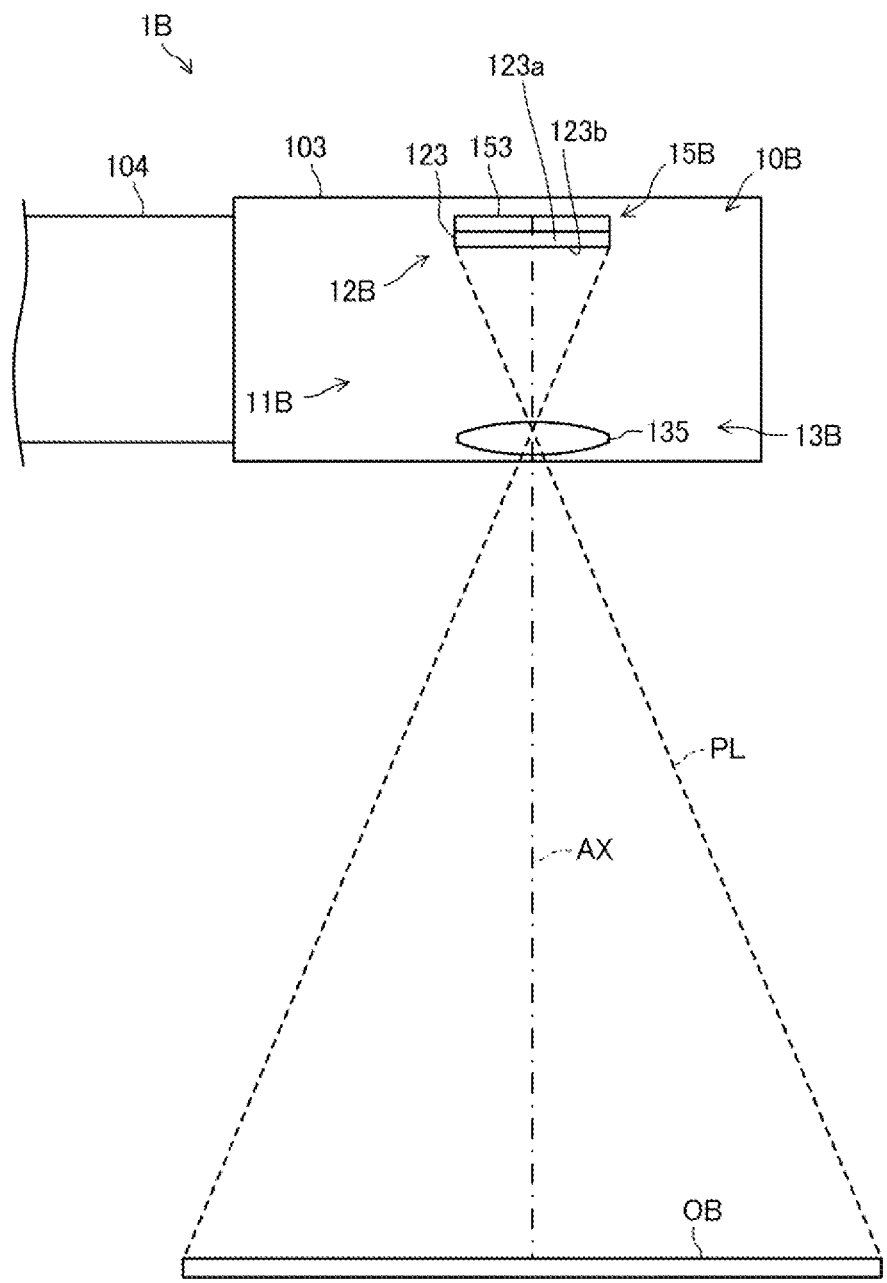
FIG. 7 is a view illustrating a configuration example of a main part of a projection device according to a third embodiment.

FIG. 7 is a view illustrating a configuration example of a main part of a projection device 1B according to a third embodiment. In the description of the projection device 1B, configurations common to the projection device 1 described in the first embodiment are denoted by the same reference signs, and the description thereof is omitted. Similar to the projection device 1, the projection device 1B is coupled to the display device 6 via the communication network 3, and thereby constitutes the projection system 1000.

In place of the optical unit 10 included in the projection device 1, the projection device 1B includes an optical unit 10B illustrated in FIG. 7. Except for the optical unit 10B, the configuration of the projection device 1B is common with that of the projection device 1.

The optical unit 10B includes a projection unit 11B and an image-capturing unit 15B. The projection unit 11B includes an image light forming unit 12B and the projection optical system 13B. The projection optical system 13B includes a lens 135. The lens 135 is an optical component that projects the image light PL formed by the image light forming unit 12B to the projection target OB to form an image at the projection target OB. The lens 135 may be identical to the lens 132 of FIG. 3, or may have a different configuration. The lens 135 may be a lens group constituted by a plurality of lenses.

The image light forming unit 12B includes a transmissive light-emitting element 123. The transmissive light-emitting element 123 has a configuration in which light-emitting bodies are disposed side by side on a translucent substrate 123a. The light-emitting bodies included in the transmissive light-emitting element 123 include light-emitting bodies that emit red light, light-emitting bodies that emit blue light, and light-emitting bodies that emit green light. With these light-emitting bodies disposed in a matrix, the light-emitting element 123 forms the image light PL. In the substrate 123a, at least a part of the portion where no light-emitting bodies are disposed transmits light.

In the transmissive light-emitting element 123, the light-emitting surface 123b in which the light-emitting bodies are disposed is disposed facing the lens 135. The image light PL emitted by the transmissive light-emitting element 123 from the light-emitting surface 123b is incident on the lens 135 along the optical axis AX. The lens 135 irradiates the projection target OB with the image light PL. The central axis of the image light PL is referred to as the optical axis AX. The optical axis AX is a virtual axis that is through the center of the light-emitting surface 123b and that is perpendicular to the light-emitting surface 123b. Furthermore, the optical axis AX is an axis through the optical center of the lens 135.

The image-capturing unit 15B includes a transmitted light imaging element 153. The transmitted light imaging element 153 corresponds to an example of an imaging element. The transmitted light imaging element 153 is disposed overlaid on the transmissive light-emitting element 123 along the optical axis AX. The outside light transmitted through the lens 135 is incident on the transmissive light-emitting element 123 along the optical axis AX. A part of the outside light incident on the transmissive light-emitting element 123 is transmitted through the transmissive light-emitting element 123 to be incident on the transmitted light imaging element 153. The transmitted light imaging element 153 performs image capturing by receiving transmitted light transmitted through the transmissive light-emitting element 123 by photosensors. The photosensors of the transmitted light imaging element 153 are disposed side by side in a surface orthogonal to the optical axis AX.

In this way, the optical unit 10B has a configuration in which the transmissive light-emitting element 123 and the transmitted light imaging element 153 are disposed overlaid on each other on the optical axis AX. That is, the image light forming unit 12B and the image-capturing unit 15B are coaxially disposed.

The lens 135 performs both the action of irradiating the image light PL emitted by the image light forming unit 12B toward the projection target OB, and the action of focusing and guiding the outside light to the transmitted light imaging element 153. In other words, the transmissive light-emitting element 123 and the transmitted light imaging element 153 each perform projection and image capturing of the image light PL by utilizing the common lens 135.

Figure 8:
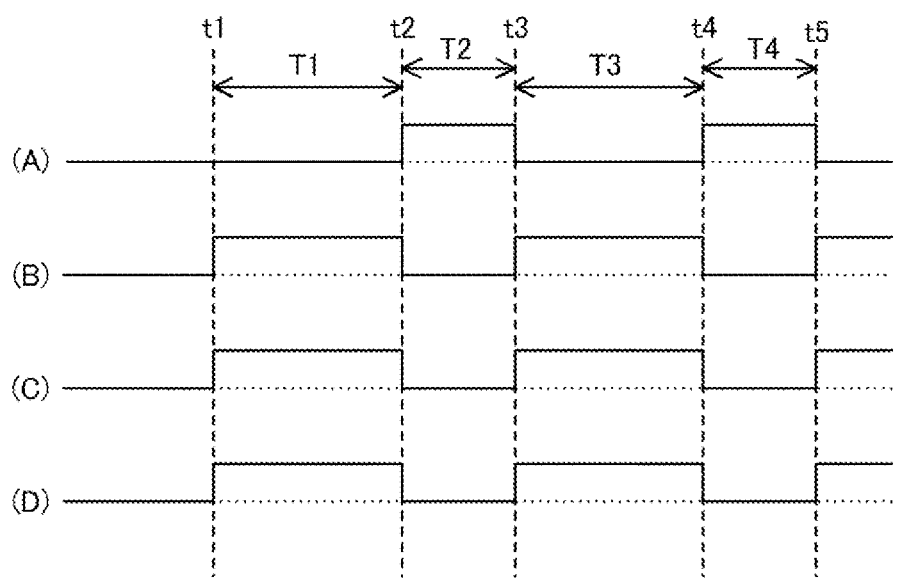
FIG. 8 is a timing chart illustrating an operation of the projection device according to the third embodiment.

FIG. 8 is a timing chart illustrating an operation of the projection device 1B.

Similar to the projection device 1 illustrated in FIG. 2, the projection device 1B drives the optical unit 10B by the driving circuit 14. Furthermore, the projection device 1B controls the image-capturing unit 15B by the PJ control unit 20.

In FIG. 8, (A) illustrates an operation of the transmitted light imaging element 153. To put it in detail, (A) illustrates the operation in which the PJ control unit 20 reads out detection values of photosensors from the transmitted light imaging element 153.

In FIG. 8, (B) illustrates an operation of the red light-emitting bodies included in the transmissive light-emitting element 123; (C) illustrates an operation of the blue light-emitting bodies included in the transmissive light-emitting element 123; and (D) illustrates an operation of the green light-emitting bodies included in the transmissive light-emitting element 123. Operations in which the driving circuit 14 causes the red light-emitting bodies, the blue light-emitting bodies, and the green light-emitting bodies to emit light, respectively, are illustrated.

As illustrated in FIG. 8, under the control of the PJ control unit 20, the driving circuit 14 causes the light-emitting bodies of the transmissive light-emitting element 123 to emit light at time t1, and causes light emission to be stopped at time t2. Accordingly, the light-emitting bodies of the transmissive light-emitting element 123 emits light in a period T1 from the time t1 to t2. The period T1 indicates a period in which the driving circuit 14 drives the light-emitting bodies of the transmissive light-emitting element 123. The period T1 does not mean that the light-emitting bodies of the transmissive light-emitting element 123 is always on in the period T1. For example, when the light-emitting bodies of the transmissive light-emitting element 123 are solid-state light sources such as the LED and OLED described above, the driving circuit 14 controls the brightness of the light-emitting bodies of the transmissive light-emitting element 123 by pulse wave modulation (PWM) control. In this case, the light-emitting bodies of the transmissive light-emitting element 123 are repeatedly turned on and off in the period T1. However, such repetition is not illustrated in FIG. 8. The same applies to a period T3 to be described later.

The PJ control unit 20 reads out detection values of the transmitted light imaging element 153 in a period T2 from the time t2 to t3. The driving circuit 14 does not cause the transmissive light-emitting element 123 to emit light until the time t3. Thereafter, under the control of the PJ control unit 20, the driving circuit 14 causes the transmissive light-emitting element 123 to emit light in the period T3 from the time t3 to t4. In the period T3, the PJ control unit 20 does not perform reading out of the transmitted light imaging element 153. The driving circuit 14 causes the transmissive light-emitting element 123 to emit light until the time t4, and causes light emission to be stopped at the time t4. The PJ control unit 20 reads out detection values of the transmitted light imaging element 153 in a period T4 from the time t4 to t5. The PJ control unit 20 repeatedly performs the operation illustrated in FIG. 8.

FIG. 8 is a diagram schematically illustrating the operations of the transmissive light-emitting element 123 and the transmitted light imaging element 153. The length of the periods T1, T2, T3, and T4 is not limited to that in the example of FIG. 8. For example, the period T1 and the period T3 need not be of the same length. The same applies to the period T2 and the period T4.

As illustrated in FIG. 8, the PJ control unit 20 performs control such that the period in which the transmissive light-emitting element 123 are caused to emit light by the driving circuit 14 and the period in which reading out from the transmitted light imaging element 153 is performed do not overlap each other. That is, the transmissive light-emitting element 123 does not emit light while the PJ control unit 20 performs reading out from the transmitted light imaging element 153. Thus, the transmitted light imaging element 153 can receive the outside light without being affected by the image light PL emitted by the transmissive light-emitting element 123. Accordingly, in a configuration in which the transmissive light-emitting element 123 and the transmitted light imaging element 153 are disposed overlaid on each other on the optical axis AX, an image of the outside light can be appropriately captured by the transmitted light imaging element 153.

In this way, the projection device 1B according to the third embodiment includes the optical unit 10B. The optical unit 10B includes the transmissive light-emitting element 123 and the transmitted light imaging element 153 disposed overlaid on each other in the direction of the optical axis AX. The transmissive light-emitting element 123 and the transmitted light imaging element 153 are disposed such that the transmissive light-emitting element 123 and the light-emitting surface 123b of the image light forming unit 12B intersects the optical axis of the lens 135 of the projection optical system. 13, and the light-receiving surface of the transmitted light imaging element 153 intersects the optical axis of the projection optical system 13.

The image-capturing unit 15B performs image capturing by receiving light focused by the lens 135 included in the projection optical system 13B. Thus, the lens 135 that projects the image light PL can be utilized for image capturing by the image-capturing unit 15B. Accordingly, the projection device 1B can have a compact configuration. Moreover, the optical axis AX on which the projection unit 11B projects the image light PL and the optical axis AX on which the image-capturing unit 15 performs image capturing are the same. Thus, distortion caused when an image of the projection image PP formed in the projection target OB by the image light PL is captured by the image-capturing unit 15B can be suppressed. In addition, by disposing the transmissive light-emitting element 123 and the transmitted light imaging element 153 overlaid on each other, a configuration can be realized in which the projection device 1B coaxially performs projection and image capturing of the image light PL without using the dichroic prism 131 or the dichroic mirror 133. Accordingly, the state of the projection target OB can be shared between the display device 6 and the projection device 1B by high-quality images.

In addition, a configuration can be employed in which, similar to the projection devices 1 and 1A, the projection device 1B includes the fixing portion 101 and the optical unit case 103 coupled to the fixing portion 101, and the optical unit 10B is housed in the optical unit case 103.

As illustrated in FIG. 8, the PJ control unit 20 stops light emission of the transmissive light-emitting element 123 while the image-capturing unit 15B performs image capturing by the transmitted light imaging element 153, and stops image capturing by the image-capturing unit 15B while the transmissive light-emitting element 123 is emitting light. As a result, the transmitted light imaging element 153 can perform image capturing without being affected by the light emitted by the transmissive light-emitting element 123. Accordingly, in a configuration in which the transmissive light-emitting element 123 and the transmitted light imaging element 153 are close to each other, high-quality captured images can be obtained by the transmitted light imaging element 153.

In the third embodiment, the transmitted light imaging element 153 may include a wavelength selection filter, and may receive light transmitted through the wavelength selection filter. For example, the transmitted light imaging element 153 may include a wavelength selection filter on a surface facing the transmissive light-emitting element 123. This wavelength selection filter can be a filter that attenuates the wavelength region of the light emitted by the blue light-emitting bodies, the red light-emitting bodies, and the green light-emitting bodies included in the transmissive light-emitting element 123. In this case, the transmitted light imaging element 153 can perform image capturing without being affected by the light emitted by the transmissive light-emitting element 123. Accordingly, in a configuration in which the transmissive light-emitting element 123 and the transmitted light imaging element 153 are close to each other, high-quality captured images can be obtained by the transmitted light imaging element 153. When the wavelength selection filter is provided at the transmitted light imaging element 153, the PJ control unit 20 may omit the control illustrated in FIG. 8. That is, reading out from the transmitted light imaging element 153 may be performed while the transmissive light-emitting element 123 emits light.

4. Fourth Embodiment

Figure 9:
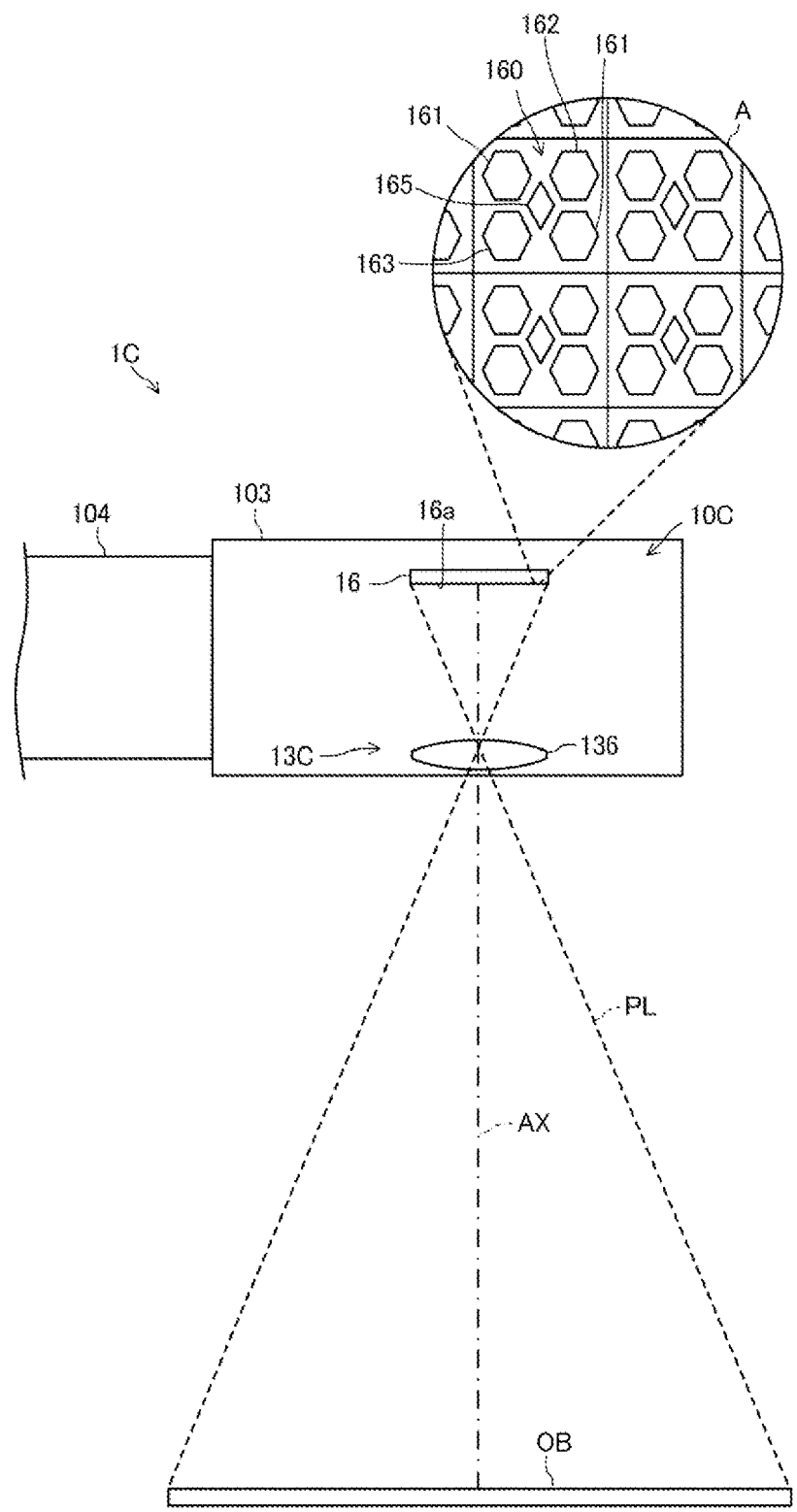
FIG. 9 is a view illustrating a configuration example of a main part of a projection device according to a fourth embodiment.

FIG. 9 is a view illustrating a configuration example of a main part of a projection device 1C according to a fourth embodiment. In the description of the projection device 1C, configurations common to the projection device 1 described in the first embodiment are denoted by the same reference signs, and the description thereof is omitted. Similar to the projection device 1, the projection device 1C is coupled to the display device 6 via the communication network 3, and thereby constitutes the projection system 1000.

In place of the optical unit 10 included in the projection device 1, the projection device 1C includes an optical unit 10C illustrated in FIG. 9. Except for the optical unit 10C, the configuration of the projection device 1C is common with that of the projection device 1.

The optical unit 10C includes a projection optical system 13C, and a light-emitting/receiving element 16 that serves both as the image light forming unit and the image-capturing unit. The projection optical system 13C includes a lens 136. The lens 136 is an optical component that projects the image light PL formed by the light-emitting/receiving element 16 to the projection target OB to form an image at the projection target OB. The lens 136 may be identical to the lens 132 of FIG. 3 or the lens 135 of FIG. 7, or may have a different configuration. The lens 136 may be a lens group constituted by a plurality of lenses.

The light-emitting/receiving element 16 is disposed on the optical axis AX of the lens 136. The light-emitting/receiving element 16 includes light-emitting bodies and photosensors in the light-emitting/receiving surface 16a facing the lens 136. That is, as illustrated enlarged in the circle A in FIG. 9, blue light-emitting bodies 161, red light-emitting bodies 162, green light-emitting bodies 163, and photosensors 165 are disposed in the light-emitting/receiving surface 16a. The light-emitting/receiving surface 16a corresponds to an example of a light-emitting surface. The blue light-emitting bodies 161, the red light-emitting bodies 162, and the green light-emitting bodies 163 are light-emitting bodies.

The blue light-emitting bodies 161, the red light-emitting bodies 162, and the green light-emitting bodies 163 are constituted by LEDs or OLEDs, for example. The blue light-emitting bodies 161 are elements that emit light in a blue wavelength region. The red light-emitting bodies 162 are elements that emit light in a red wavelength region. The green light-emitting bodies 163 are elements that emit light in a green wavelength region. In the example of FIG. 9, one pixel area 160 includes two blue light-emitting bodies 161, one red light-emitting body 162, and one green light-emitting body 163. The pixel area 160 forms one pixel included in the image formed by the light-emitting/receiving element 16. In the example of FIG. 9, the pixel area 160 forms the color of one pixel by two blue light-emitting bodies 161, one red light-emitting body 162, and one green light-emitting body 163.

The light-emitting/receiving surface 16a includes one photosensor 165 per one pixel area 160. The photosensor 165 is an element including a CMOS or a CCD. The photosensor 165 receives light incident on the light-emitting/receiving surface 16a. The image-capturing unit 15 performs image capturing by receiving light by the photosensors 165.

The light-emitting/receiving element 16 functions as an image light forming unit that forms the image light PL, and as an image-capturing unit that performs image capturing. The optical axis of the image light PL emitted by the light-emitting/receiving element 16 is the optical axis AX. The light-emitting/receiving element 16 performs image capturing by light incident on the light-emitting/receiving element 16 along the optical axis AX. Similar to the optical unit 10B illustrated in FIG. 7, in the optical unit 10C, the projection unit and the image-capturing unit are optically coaxially disposed, and the optical axis AX for projection is common with the optical axis AX for image capturing.

The projection device 1C performs light emission and image capturing of the light-emitting/receiving element 16 in a manner similar to the operation described in FIG. 8 of the third embodiment. Specifically, the PJ control unit 20 of the projection device 1C controls light emission of the blue light-emitting bodies 161, the red light-emitting bodies 162, and the green light-emitting bodies 163 in a manner similar to the light emission timing of the transmissive light-emitting element 123. Furthermore, the PJ control unit 20 performs reading out of the photosensors 165 at a timing similar to that of the transmitted light imaging element 153. Thus, reading out of the photosensors 165 is not performed while the blue light-emitting bodies 161, the red light-emitting bodies 162, and the green light-emitting bodies 163 emit light; and the blue light-emitting bodies 161, the red light-emitting bodies 162, and the green light-emitting bodies 163 do not emit light while reading out of the photosensors 165 is performed. Accordingly, the photosensors 165 can perform image capturing without being affected by light emission of the blue light-emitting bodies 161, the red light-emitting bodies 162, and the green light-emitting bodies 163.

In this way, the projection device 1C according to the fourth embodiment includes the optical unit 10C including the light-emitting/receiving element 16 having the functions of both the projection unit and the image-capturing unit. The light-emitting/receiving element 16 that is the image light forming unit of the optical unit 10C includes blue light-emitting bodies 161, red light-emitting bodies 162, and green light-emitting bodies 163 that are light-emitting bodies disposed side by side in the light-emitting surface. The light-emitting/receiving element 16 also serves as an imaging element, and includes a plurality of photosensors 165 disposed in a matrix in the light-receiving surface. In addition, the light-emitting surface and the light-receiving surface of the light-emitting/receiving element 16 are the same light-emitting/receiving surface 16a. According to this configuration, by using the light-emitting/receiving element 16 that serves both as the projection unit and the image-capturing unit, a configuration can be realized in which projection and image capturing of the image light PL is coaxially performed without using the dichroic prism 131 or the dichroic mirror 133. Thus, the state of the projection target OB can be shared between the display device 6 and the projection device 1B by high-quality images, and the projection device 1C can be further downsized.

The projection device 1C stops light emission of the blue light-emitting bodies 161, the red light-emitting bodies 162, and the green light-emitting bodies 163 while image capturing by the photosensors 165 of the light-emitting/receiving element 16 is performed. Furthermore, image capturing by the photosensors 165 is stopped while the blue light-emitting bodies 161, the red light-emitting bodies 162, and the green light-emitting bodies 163 are emitting light. As a result, image capturing can be performed by the photosensors 165 without being affected by the light emitted by the blue light-emitting bodies 161, the red light-emitting bodies 162, and the green light-emitting bodies 163. Accordingly, in a configuration in which the light-emitting/receiving element 16 serves both as the light-emitting element and the imaging element, high-quality captured images can be obtained.

5. Fifth Embodiment

Figure 10:
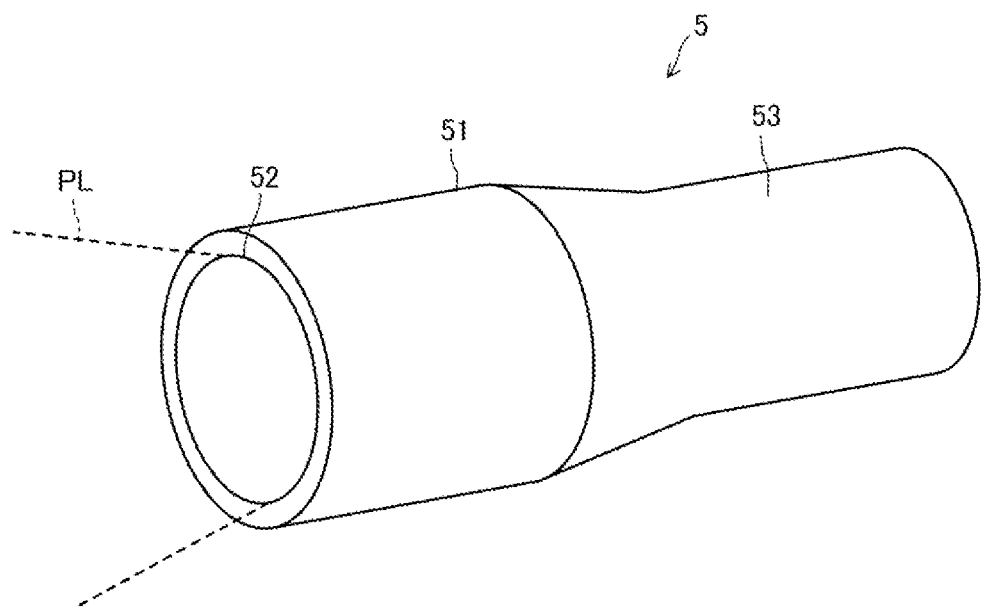
FIG. 10 is an external view of a portable projection device according to a fifth embodiment.
Figure 11:
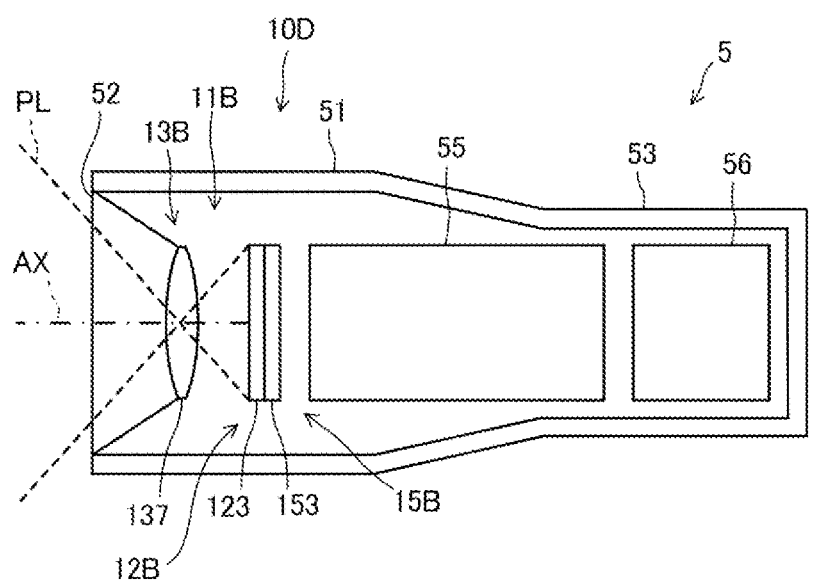
FIG. 11 is a cross-sectional view of the portable projection device according to the fifth embodiment.

FIG. 10 is an external view of a portable projection device 5 according to a fifth embodiment. FIG. 11 is a cross-sectional view of the portable projection device 5.

The portable projection device 5 is a portable device that can be used by the user while held in hand. The portable projection device 5 includes a main body casing 51 having a cylindrical shape. Components to be described later are housed in the main body casing 51. A gripping portion 53 is provided on one end side of the main body casing 51. The gripping portion 53 is a part of the main body casing 51 in which the diameter is reduced. Since the gripping portion 53 has a reduced diameter, the user can easily grip the portable projection device 5 by hand. The main body casing 51 corresponds to an example of an outer packaging.

An opening 52 is provided at the tip of the main body casing 51. The portable projection device 5 projects the image light PL from the opening 52. As a result, the image light PL can be projected to a projection target located in the direction in which the opening 52 is oriented to form a projection image.

As illustrated in FIG. 11, the main body casing 51 houses an optical unit 10D, a driving unit 55, and a battery 56. The optical unit 10D includes, for example, the image light forming unit 12B and the image-capturing unit 15B described with reference to FIG. 7. Furthermore, the optical unit 100 includes a lens 137 as a projection optical system 13D. The lens 137 is an optical component that guides the image light PL emitted by the image light forming unit 12B in the direction of projecting from the opening 52.

The functional configuration of the projection device 10 is common with that of the projection device 1 illustrated in FIG. 2. The driving unit 55 includes at least the PJ control unit 20 and the driving circuit 14. The driving unit 55 may include the operation unit 31, the remote control light-receiving unit 32, the input interface 33, the coupling unit 41, the PJ communication unit 42, and the image processing unit 43. The remote control light-receiving unit 32 and the coupling unit 41 may be omitted from the driving unit 55. Furthermore, the PJ communication unit 42 may perform wireless communication.

The battery 56 includes a secondary battery that is repeatedly rechargeable. The battery 56 supplies power to the driving unit 55. The battery 56 corresponds to an example of a power source.

By causing the transmissive light-emitting element 123 to emit light, the portable projection device 5 can project the image light PL from the opening 52 to form a projection image. Moreover, by the transmitted light imaging element 153, the portable projection device 5 captures an image of the outside light focused by the lens 137. As a result, projection and image capturing can be performed on the common optical axis AX.

In this way, the portable projection device 5 includes the main body casing 51 that is portable, and the projection unit 11B, the image-capturing unit 15B, the PJ communication unit 42, the PJ control unit 20, and the battery 56 are housed in the main body casing 51. As a result, the user can move the portable projection device 5 while held in hand, and perform projection and image capturing of the projection image by the portable projection device 5. When the portable projection device 5 is used in the projection system 1000 in place of the projection device 1, the state of the projection target OB or the projection image can be shared between the portable projection device 5 and the display device 6 without constraints on the installation location of the portable projection device 5.

6. Other Embodiments

The above-described embodiments are preferred embodiments of the present disclosure. However, the present disclosure is not limited thereto. Various modifications can be carried out without departing from the gist of the present disclosure.

For example, in the above-described embodiments, configurations have been described in which the projection devices 1, 1A, 1B, 1C, and 1D, as well as the portable projection device 5 project a full-color projection image by the image light PL including red light, blue light, and green light. The present disclosure is not limited thereto. For example, a configuration may be employed in which a monochrome image is projected by monochromatic image light PL. Furthermore, the imaging element 151, the transmitted light imaging element 153, and the light-emitting/receiving element 16 may capture color images, or may capture monochrome images.

Figure 12:
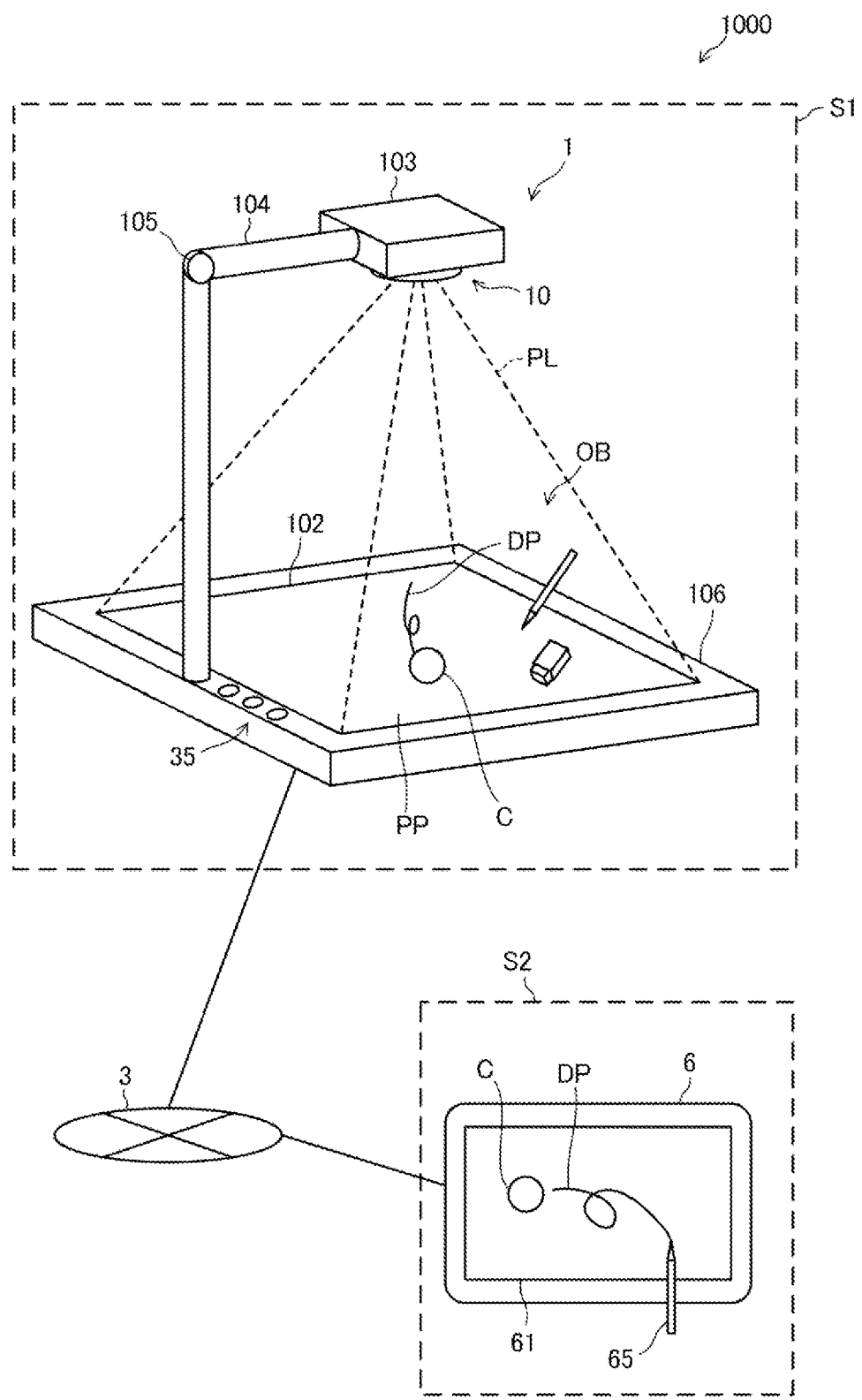
FIG. 12 is a view illustrating another configuration example of the projection system.

The projection device 1 illustrated in FIG. 1 has been described as a configuration in which the projection device 1 is fixed to the installation portion 110 by the fixing portion 101. However, a configuration may be employed in which the installation portion 110 is not required. FIG. 12 illustrates another configuration example of the projection system 1000 of FIG. 1.

A projection device 1E illustrated in FIG. 12 includes a base 106 that is in contact with an installation surface such as a desk. In the example of FIG. 12, the base 106 has a flat plate shape. The upper surface of the base 106 is utilized as the image-capturing table 102. The image-capturing table 102 may be a flat surface. However, the image-capturing table 102 may be a surface having unevenness. The image-capturing table 102 includes the projection target OB to which the projection unit 11 projects the image light PL. The base 106 corresponds to an example of a pedestal portion. The optical unit case 103 that houses the optical unit 10 is coupled to the base 106 by the arm 104. The arm 104 is erected on the base 106. Furthermore, the operating panel 35 including a switch or the like used for operation of the projection device 1E is provided at the base 106. The projection device 1E captures an image of a range including the image-capturing table 102 by the image-capturing unit 15. The projection device 1E transmits the captured image obtained by capturing an image of the image-capturing table 102 to the display device 6 via the communication network 3.

The configurations of the projection device 1 and the display device 6 illustrated in FIG. 2 illustrate functional configurations. The specific implementations of the projection device 1 and the display device 6 are not particularly limited. That is, it is not necessarily required that hardware that individually corresponds to each of the functional units be implemented. A configuration can be employed as a matter of course in which the functions of a plurality of functional units are realized by a single processor executing a program. Furthermore, in the above-described embodiments, some of the functions realized by software may be realized by hardware, and some of the functions realized by hardware may be realized by software.

Furthermore, processing units of the sequence diagram illustrated in FIG. 4 are obtained by dividing the operations of the respective devices of the projection system 1000 in accordance with the main processing content to facilitate understanding. Thus, the present disclosure is not limited by the dividing method or naming of the processing units. The processing performed by the respective devices can be divided into more processing units in accordance with the processing content, or can be divided such that one processing unit includes more processing.

The control program 26 can also be recorded in a recording medium recorded in a manner readable by the projection device 1. For the recording medium, magnetic or optical recording media, or semiconductor memory devices can be used. Specifically, examples include portable recording media such as flexible disks, optical disk recording media, magneto-optical disk recording media, and semiconductor storage devices, or fixed-type recording media. Furthermore, a configuration may be applied in which these programs are stored in a server device or the like, and the programs are downloaded from the server device as necessary. The same applies to the control program 76.

What is claimed is:

1. A projection device comprising:
a projection unit including
an image light forming unit configured to form image light, and
a projection optical system configured to project, toward a projection target, the image light formed by the image light forming unit;
an image-capturing unit including an imaging element configured to receive light through the projection optical system and configured to capture an image of a range including the projection target to generate a captured image;
a communication unit; and
a control unit configured to transmit the captured image to an information processing device by the communication unit, cause the communication unit to receive a reception image including an image drawn by the information processing device, and cause the projection unit to project the reception image, wherein
the control unit includes a reception image memory configured to store the image included in the reception image, and
when the reception image is received from the information processing device, the control unit updates, based on the reception image received, the image stored in the reception image memory, and causes the projection unit to project the updated image stored in the reception image memory.

2. The projection device according to claim 1, wherein the image-capturing unit performs image capturing by receiving light focused by a lens included in the projection optical system.

3. The projection device according to claim 1, wherein
the image light forming unit and the imaging element are arranged to overlay in a direction of an optical axis of the projection optical system such that a light-emitting surface of the image light forming unit intersects the optical axis of the projection optical system, and a light-receiving surface of the imaging element intersects the optical axis of the projection optical system.

4. The projection device according to claim 3, wherein
light emission is stopped while the image-capturing unit performs image capturing by the imaging element, and image capturing by the image-capturing unit is stopped while light is being emitted.

5. The projection device according to claim 3, wherein the imaging element includes a wavelength selection filter and receives light transmitted through the wavelength selection filter.

6. The projection device according to claim 1, wherein
the image light forming unit includes light-emitting bodies arranged side by side in a light-emitting surface,
the imaging element includes a plurality of photosensors arranged in a matrix in a light-receiving surface, and
the light-emitting surface and the light-receiving surface are a same surface.

7. The projection device according to claim 1, further comprising:
a pedestal portion; and
a projection unit case coupled to the pedestal portion, wherein
the projection unit and the image-capturing unit are housed in the projection unit case.

8. The projection device according to claim 1, further comprising
a portable outer packaging, wherein
the projection unit, the image-capturing unit, the communication unit, the control unit, and a power source are housed in the outer packaging.

9. A projection device comprising:
a projection unit including
an image light forming unit configured to form image light, and
a projection optical system configured to project, toward a projection target, the image light formed by the image light forming unit;
an image-capturing unit including an imaging element configured to receive light through the projection optical system and configured to capture an image of a range including the projection target to generate a captured image;
a communication unit; and
a control unit configured to transmit the captured image to an information processing device by the communication unit, cause the communication unit to receive a reception image including an image drawn by the information processing device, and cause the projection unit to project the reception image,
wherein the image-capturing unit performs image capturing by receiving light focused by a lens included in the projection optical system,
wherein the projection optical system includes a separation optical member configured to separate light incident from the projection target from the image light and guide the separated light to the imaging element.

10. The projection device according to claim 9, wherein the separation optical member includes a dichroic prism.

11. The projection device according to claim 9, wherein the separation optical member includes a dichroic mirror.

12. The projection device according to claim 9, wherein the separation optical member includes a polarization separation film configured to separate light by polarization.

13. The projection device according to claim 9, wherein the separation optical member includes a wavelength separation film configured to separate light having different wavelengths.

14. The projection device according to claim 9, wherein the separation optical member includes a semi-transmissive film.

15. A method for controlling a projection device that includes a projection unit configured to project image light to a projection target, an image-capturing unit configured to capture an image of a range including the projection target to generate a captured image, and a communication unit configured to communicate with an information processing device, the method comprising:
- by the communication unit, transmitting the captured image generated by the image-capturing unit as a first image to the information processing device and receiving a second image including a first drawing image drawn relative to the first image in the information processing device;
- by the projection unit, projecting the first drawing image to the projection target;
- by the image-capturing unit, capturing the image of the range including the projection target to which the first drawing image is projected to generate the captured image;
- by the communication unit, transmitting the captured image as a third image to the information processing device and receiving a fourth image including a second drawing image drawn relative to the third image in the information processing device; and
- by the projection unit, projecting the first drawing image and the second drawing image to the projection target.

* * * * *